US012251721B2

(12) United States Patent
Goettke

(10) Patent No.: US 12,251,721 B2
(45) Date of Patent: Mar. 18, 2025

(54) PUMP FOR DISPENSING A FLUID

(71) Applicant: RPC Bramlage GmbH, Lohne (DE)

(72) Inventor: Sabine Goettke, Lohne (DE)

(73) Assignee: RPC Bramlage GmbH, Lohne (DE)

( * ) Notice: Subject to any disclaimer, the term of this patent is extended or adjusted under 35 U.S.C. 154(b) by 238 days.

(21) Appl. No.: 17/927,959

(22) PCT Filed: May 28, 2021

(86) PCT No.: PCT/EP2021/064424
§ 371 (c)(1),
(2) Date: Nov. 28, 2022

(87) PCT Pub. No.: WO2021/239985
PCT Pub. Date: Dec. 2, 2021

(65) Prior Publication Data

US 2023/0249206 A1 Aug. 10, 2023

(30) Foreign Application Priority Data

May 29, 2020 (GB) ...................................... 2008086
Dec. 11, 2020 (GB) ...................................... 2019553

(51) Int. Cl.
*B05B 11/00* (2023.01)
*B05B 11/10* (2023.01)
(Continued)

(52) U.S. Cl.
CPC ...... *B05B 11/1077* (2023.01); *B05B 11/0044* (2018.08); *B05B 11/0089* (2013.01);
(Continued)

(58) Field of Classification Search
CPC ............. B05B 11/1077; B05B 11/1023; B05B 11/1047; B05B 11/1053; B05B 11/1059;
(Continued)

(56) References Cited

U.S. PATENT DOCUMENTS 4,685,594 A 8/1987 Czech
5,238,156 A * 8/1993 Andris ................ B05B 11/1074
222/207

(Continued)

FOREIGN PATENT DOCUMENTS

DE 10 2007 024 724 A1 7/2008
KR 102 044 128 B1 11/2019
WO 2020/156933 A1 8/2020

OTHER PUBLICATIONS

Notification of Transmittal of the International Search Report and Written Opinion of the International Searching Authority, or the Declaration, along with the International Search Report and Written Opinion of the International Searching Authority in PCT/EP2021/064424, mailed Dec. 20, 2021.

(Continued)

*Primary Examiner* — Frederick C Nicolas
(74) *Attorney, Agent, or Firm* — Collard & Roe, P.C.

(57) ABSTRACT

A pump for dispensing a fluid, has a pump head, a piston with a piston body, a pump chamber provided by a pump chamber part, an inlet valve and an outlet valve. The piston body is moveable relative to the pump chamber. The piston body is tube-like, providing a channel for delivering the fluid from the pump chamber via the outlet valve to an outlet opening in the pump head. The outlet valve is a valve body cooperating with a sealing rim formed by an opening in an outlet channel of the pump head. The piston body has a sealing lip for with an inner surface of the pump chamber body. The pump head is moveable relative to the piston body providing an opening stroke for the outlet valve, wherein the valve body moves axially in the opposite direction into a part of the outlet channel above the valve body.

20 Claims, 22 Drawing Sheets

(51) Int. Cl.
*B05B 15/656* (2018.01)
*F04B 19/04* (2006.01)
*F04B 53/14* (2006.01)

(52) U.S. Cl.
CPC ...... *B05B 11/1023* (2023.01); *B05B 11/1047* (2023.01); *B05B 11/1053* (2023.01); *B05B 11/1059* (2023.01); *B05B 11/1069* (2023.01); *B05B 11/1074* (2023.01); *B05B 11/1094* (2023.01); *B05B 15/656* (2018.02); *F04B 19/04* (2013.01); *F04B 53/14* (2013.01)

(58) Field of Classification Search
CPC ............. B05B 11/1069; B05B 11/1074; B05B 11/1094; B05B 11/0089; B05B 11/0044; B05B 15/656; F04B 19/04; F04B 53/14
See application file for complete search history.

(56) References Cited

U.S. PATENT DOCUMENTS

| | | | | |
|---|---|---|---|---|
| 5,505,343 | A | 4/1996 | Knickerbocker | |
| 7,770,759 | B2 | 8/2010 | Pennaneac'h | |
| 8,205,772 | B2 | 6/2012 | Hummel | |
| 10,335,813 | B2 * | 7/2019 | Wang | B05B 11/1092 |
| 2005/0023298 | A1 | 2/2005 | Crosnier | |
| 2010/0176158 | A1 * | 7/2010 | Carta | B05B 11/105<br>222/321.9 |
| 2011/0297700 | A1 | 12/2011 | Santagiuliana | |
| 2015/0251203 | A1 * | 9/2015 | Wang | B05B 11/1053<br>222/153.13 |
| 2015/0272398 | A1 | 10/2015 | Arminak | |
| 2016/0332181 | A1 | 11/2016 | Deman | |
| 2018/0339305 | A1 | 11/2018 | Wang | |
| 2022/0280958 | A1 | 9/2022 | Lee | |
| 2023/0201852 | A1 * | 6/2023 | Goettke | B05B 11/1059<br>222/401 |

OTHER PUBLICATIONS

Written Opinion of the International Preliminary Examining Authority in PCT/EP2021/064424, mailed May 24, 2022.
International Preliminary Report on Patentability in PCT/EP2021/064424, dated Aug. 18, 2022.

* cited by examiner

Fig. 3
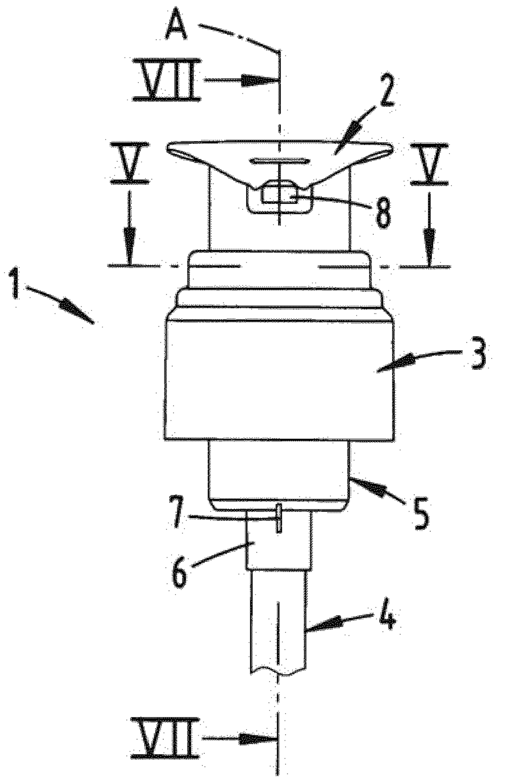
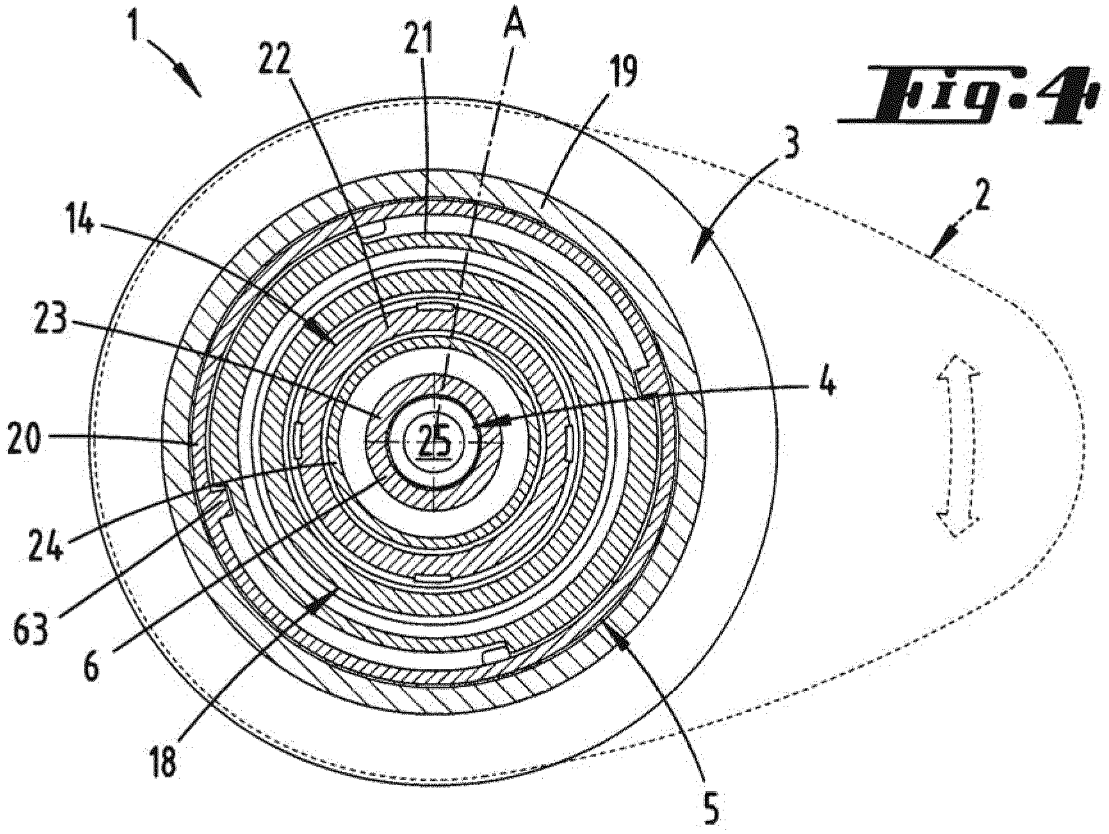
Fig. 4

Fig. 29
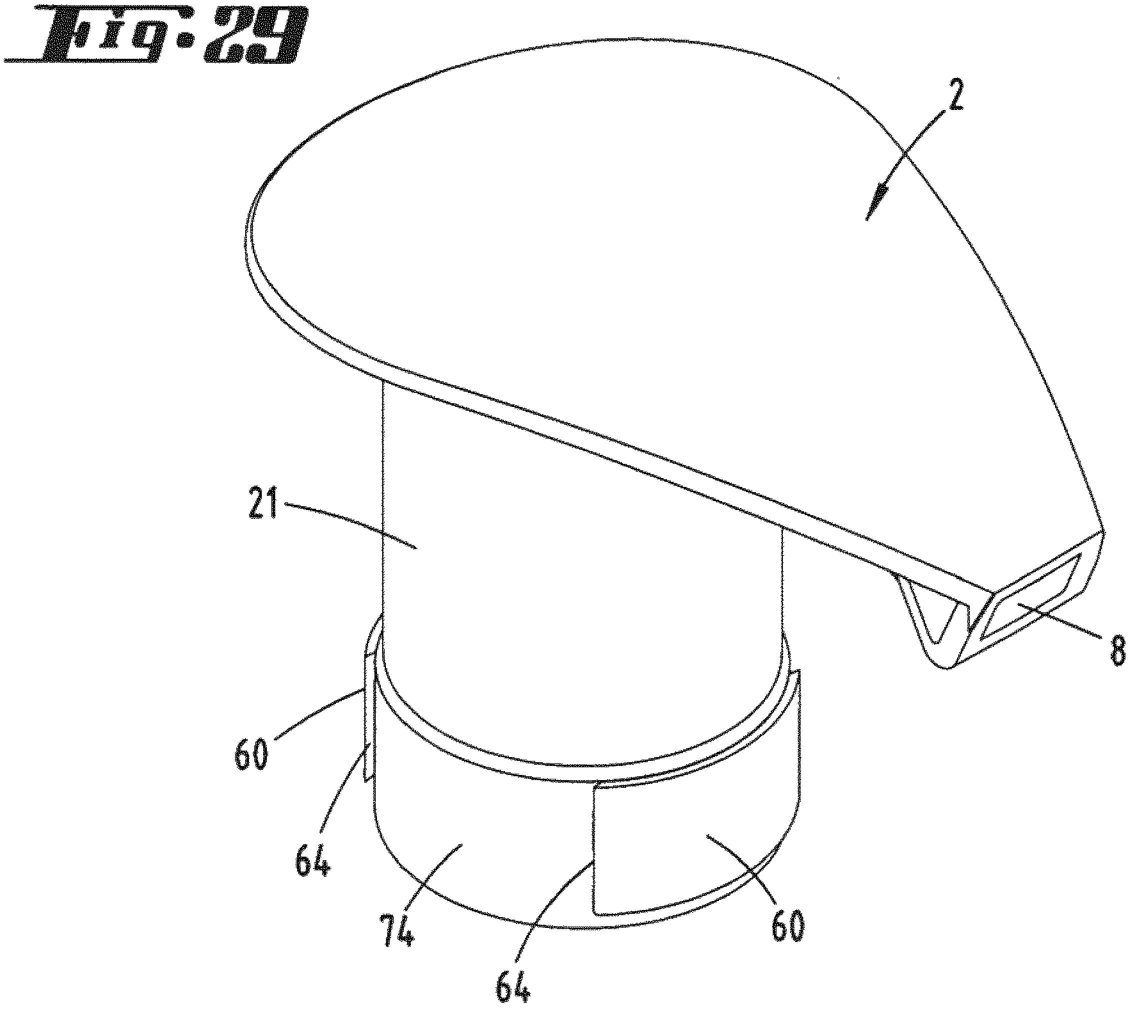
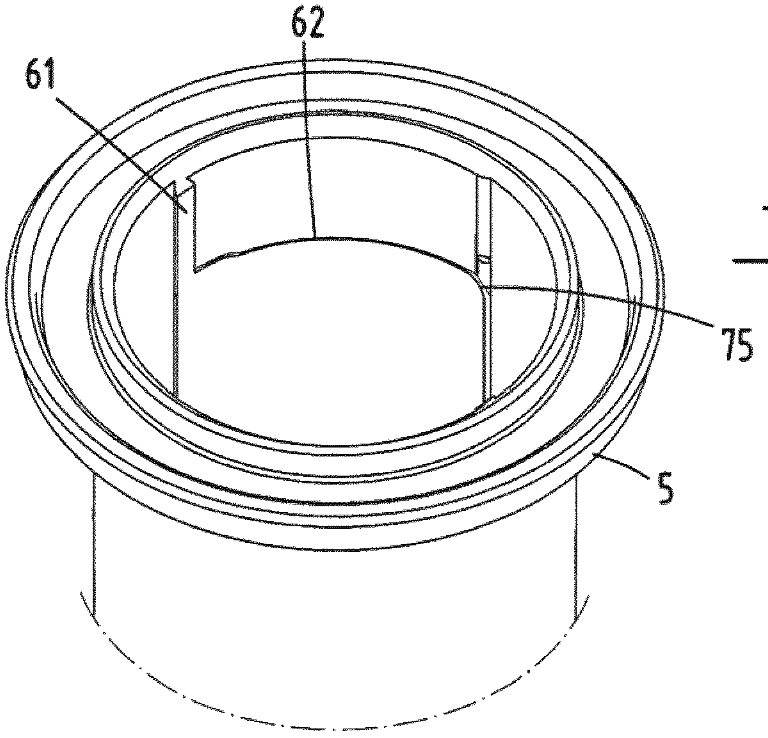
Fig. 30

PUMP FOR DISPENSING A FLUID

CROSS REFERENCE TO RELATED APPLICATIONS

This application is the National Stage of PCT/EP2021/064424 filed on May 28, 2021, which claims priority under 35 U.S.C. § 119 of British Application No. 2008086.7 filed on May 29, 2020 and British Application No. 2019553.3 filed on Dec. 11, 2020, the disclosures of which are incorporated by reference. The international application under PCT article 21(2) was not published in English.

BACKGROUND OF THE INVENTION

1. Field of the Invention

The invention is concerned with a pump for dispensing a fluid, with a pump head, a piston with a piston body, a pump chamber provided by a pump chamber part, an inlet valve and an outlet valve, the piston body is moveable relatively to the pump chamber.

2. Description of the Related Art

Pumps for dispensing a fluid, which can be also a pasty fluid, are known from several embodiments. For example is referred to U.S. Pat. No. 8,205,772 B2 and U.S. Pat. No. 7,770,759 B2. The first reference does disclose a dispenser with an outlet valve being actively moved by the pump head in an open position, with movement opposite to the delivery direction of the fluid. The second reference shows an outlet valve which is acted on only by pressure of the fluid created during the pumping stroke.

US 2018/339305 A1 does disclose a pump with an outlet valve having a dish-like upper part with an annular notch on its lower surface. In the closed position a complementing rim is received in the notch.

DE 10 2007 024 724 A1 does disclose a pump with an outlet valve having a conical outer surface cooperating with a conical surface of a sealing part in a closed condition of the outlet valve.

US 2005/023298 A1 does disclose a pump with a piston body wherein a lower end of the piston body provides the outlet valve. This lower end is also cooperating with a membrane extending below the piston body proving providing the restoring means.

US 2016/332181 A1 does disclose a pump with a piston body being received within a membrane part providing for the restoring forces. The pump head has an inner and outer wall, wherein the inner wall cooperates also with the membrane part.

KR 102044128 B1 does disclose a pump with a pump head having a skirt with a skirt rim. The pump head is turnable in the starting position about a vertical axis wherein also a shoulder is provided for being axially distant to a first stop, such providing a horizontal space for receiving the skirt rim. The locked position is limited by a second stop.

SUMMARY OF THE INVENTION

In view of the state of the art referred to, the invention is concerned with the object to provide a pump for dispensing a fluid, being advantageously designed.

According to a first aspect of the invention, there is provided a pump for dispensing a fluid, wherein is focused on the outlet valve consisting of a disc-like valve part with an outer upward protruding circumferential rim part, the outlet valve is cooperating with the sealing rim provided for in the pump head given by an opening in an outlet channel, extending within, and at least in the opening position, through a short tube-like portion, wherein further the disc-like valve part is lying on the rim by means of an edge designed at the outer surface of the disc-like valve part, wherein the outer surface is in a cross section convex designed, providing such the edge, or due to compression of the disc-like valve part, being in this case elastic, a comparatively broad sealing contact is given by surfaces lying on each other on a rather cylindrical area.

The pump has an effective opening and closing mechanism. The outlet valve is possible to be provided for near the upper end of the pump as such, leading preferably directly into the outlet channel of the pump head.

According to a further aspect of the invention, there is provided a pump for dispensing a fluid, wherein is focused on that the restoring means being positioned outside, wherein further the pump has restoring means for moving the pump head and the piston from the lower end position back to the starting position, wherein further the restoring means being positioned outside the channel for delivering the fluid, not coming into contact with the fluid especially not when dispensing the fluid, wherein further the restoring means are positioned even outside the outer wall of the piston body.

According to a still further aspect of the invention there is provided a pump for dispensing a fluid, wherein is focused on a second stop being overrunable, wherein further the locked position is limited by the second stop, also provided for at the pump chamber part or another respective pump part, and an end surface of the skirt rim resting against the second stop when the pump head is turned in the locked position, wherein further the second stop is overrunable by the skirt and/or protruding ribs, which at once provide the user with a sensitive reaction that he is turning the pump head ratchet like, the first stop being not overrunable, wherein the second stop is first reached by the skirt rim when turning the pump head into the locking position, and wherein below the second stop is a sloping surface to guide the pump head by means of the lower edge of the skirt rim into a raised position if this is not yet given when turning the pump head into the locking position.

The piston body with two concentric walls is a stable part of the pump due to the concentric walls. At once, it is advantageously providing a respective guiding wall of the pump head.

The locking of the pump head in the starting position is easily performed by a respective design of one pump part or cooperating pump parts of the pump. With the pump head such locked, during transport for example, the pump cannot inadvertently dispense the fluid.

The embodiments differently described before and below, can also be provided for, two or all of them, combined at a respective single embodiment of such pump.

Preferably, the pump has restoring means for moving the pump head or the pump head and the piston from the lower end position back to the starting position. Such restoring means may be provided for by a bellows. Such restoring means may also be provided for by a spring, further preferably by a plastic spring. As to such plastic spring is for example referred to WO 2020/156933 A1.

As far as a bellows is provided for, the bellows is preferably a plastic bellows. The bellows may have preferably a closed bellows wall. The bellows wall may further have upper and/lower shoulder parts for resting against the pump head and/or a further pump part. The bellows may rest against the pump head with the upper shoulder parts and against a pump part with the lower shoulder parts. The further pump part, the bellows is resting against with the lower shoulder part, is preferably the pump chamber body.

The restoring means being preferably positioned outside the channel for delivering the fluid. The restoring means will therefore preferably not come into contact with the fluid, especially not when dispensing the fluid.

On the one or more pump parts, the stop as well as the space rim are provided for. Specifically, the stop may be provided for at a pump housing part being preferably at least part of an outer surface of the pump. This outer surface being visible by a user at a normal use of the dispenser. More specifically, this pump housing part may be a screw cap or a fastening cap. The space rim may be provided for at the pump chamber part. The stop and/or the space rim may extend in circumferential direction. Possibly, they may extend over a circumferential angle, seen from a geometrical middle axis of the pump, of e.g. 10 or more degrees up to e.g. 30, 40, 60 or 90 degrees or even more. The stop may have a longer circumferential extension than the space rim. The stop may have an extension all around, i.e. 360 degrees.

The bellows may have in a vertical direction, which is given at the pump in a fluid flow direction when flowing through the channel in the piston body, in a vertical cross section, a –zig-zag configuration provided for by a plurality of bulges above each other in said vertical direction. The number of bulges may be 5 or more, e. g. up to 10 or 20 or even more. The bellows further may be in a general cylindrical shape. In an assembled state of the pump, a geometrical middle axis of the bellows may be coincident with the geometrical middle axis of the pump. Specifically one may be able to distinguish to geometrical cylinders, being coincident with the same middle axis, in which radio distance between said cylinders may extend a plurality or even all the bulges of the bellows. The bulges may extend between the two geometrical cylinders of even distance in a circumferential direction.

In an embodiment, in which the piston body has two walls, an inner wall and an outer wall, the restoring means are preferably positioned even outside the outer wall of the piston body.

The lower shoulder part which is preferably continuously given in circumferential direction is further preferably arranged in the starting position above a sealing lip of the piston, for example above an upper sealing lip of the piston in case the piston has two or more sealing lips. The sealing lip of the piston being for engagement with the inner surface of the pump chamber body, in the starting position of the pump head or of the piston body respectively. The sealing lip may further, in this starting position, be in abutment to the lower shoulder part of the restoring means, preferably the shoulder part of the bellows. This may even provide some stop for the piston or the piston body respectively in the upper starting position. The sealing lip will preferably move along the inner surface of the pump chamber body when the piston is moving from the starting position to the lower end position and back to the starting position.

The pump head may have a pump head wall which might also be addressed as a guide skirt, preferably for being guided relatively to the piston body.

The pump head further may have two circumferential pump head walls, preferably one of the pump head walls, more preferably both of the pump head walls being in engagement with the piston body. The pump head walls may be combined at a common ceiling part and being distant to each other over the whole circumference and up to a lower end of both the walls, seen in a dispensing direction of the fluid. Seen in that dispensing direction, first are the lower ends of the walls and second the ceiling part.

The inner pump head wall is preferably cooperating with an outer surface of a piston body wall. More preferably, the inner pump head wall is cooperating with an outer surface of an inner wall of the piston body in case the piston body has two circumferential walls being concentrically arranged to each other. The cooperation is preferably a sliding engagement between the mentioned parts. The cooperation may provide additionally or in the alternative a stop for the pumping head when moving relatively to the piston body, marking an end position in which the outlet valve is open.

A further, second pump head wall being outside and preferably concentric to the first, inner pump head wall, may be in engagement with a further wall of the piston body, preferably with in inner surface of said further, second piston body wall. The second pump head wall is further preferably for defining additionally or instead to the engagement between the first or inner pump head wall of the piston body a relative movement of the pump head relative to the pump piston upon a pumping stroke. The relative movement of the pump head relatively to the piston body when performing a pumping stroke by moving from the upper starting position to the lower end position is further preferably much less than the whole length of such pumping stroke. It might be in the range of one tenth or lower e.g. up to one hundredth of such pumping stroke.

The pump head may have a further, third pump head wall. The third pump head wall being further preferably also circumferential to the first and/or second pump head wall, with a further radial distance to the outside to the first or second pump head wall respectively.

The third pump head wall may cooperate with the pump housing part and/or the pump chamber body. The pump head may be guided relatively to the pump chamber body by means of this possibly third pump head wall. Further preferably the said pump head wall, or one of the pump head walls, possibly the third pump head wall may serve for a locking of the pump head in the starting position.

The inlet valve may be provided for in a bottom of the pump head outlet channel. The inlet valve may be provided for in an extension of the bottom of the pump chamber and may be situated above the sealing lips of the piston engaging the inner surface of the pump chamber, in the starting position of the pump head as well as in the actuated position of the pump head. By such a design, an advantageously small rest volume pump chamber can get provided for.

The opening in the pump head, providing the sealing rim for the outlet valve, is preferably in a bottom of the pump head fluid channel. The outlet valve body is therefore upon initiating the pumping stroke by for example pressing by a user on the pump head raised into the pump head fluid channel. The outlet valve body is raised into the direction or even in engagement with the upper surface of pump head fluid channel, seen in a vertical section.

The fluid flowing through the open outlet valve into the fluid pump head channel is preferably at once diverted for about a right angle.

Concerning the rim provided at the skirt of the pump head, this rim is preferably extending only over a part of the circumference of the skirt. This might be provided for by a rim having over the circumference different radial extensions. In this respect, when having different radial extensions, hereby is addressed the part having over a certain circumferential length the furthest radial extension.

As to the circumferential length, the rim provided for at the skirt of the pump head may extend over about 90 degrees for example.

The horizontal space provided for in the pump part is limited by a circumferential stop, engageable by an end of the rim upon the said turning movement.

BRIEF DESCRIPTION OF THE DRAWINGS

Further, the invention is explained in view of the enclosed drawings, which show:

FIG. 3 the pump according to FIG. 1 or FIG. 2 in a front view;

FIG. 4 the pump according to FIG. 2, cut along the line IV-IV shown in FIG. 2;

FIG. 29 a perspective outer view of the pump head similar to FIG. 19, concerning the embodiment according to FIGS. 27 and 28; and FIG. 30 a perspective view of a pumping part, seeing from above, similar to the view of FIG. 20 for the embodiment of FIGS. 27 through 30.

DETAILED DESCRIPTION OF PREFERRED EMBODIMENTS

Figure 1:
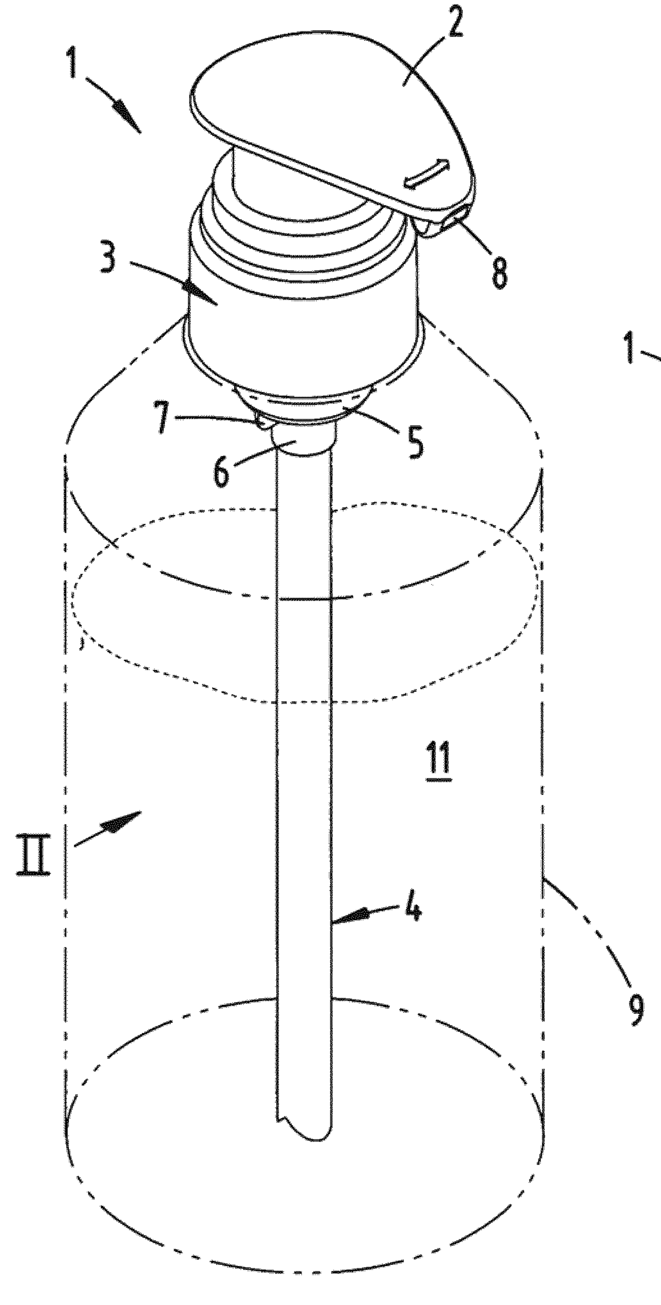
FIG. 1 a perspective view of a pump, allocated to a only in principle indicated receptacle.
Figure 2:
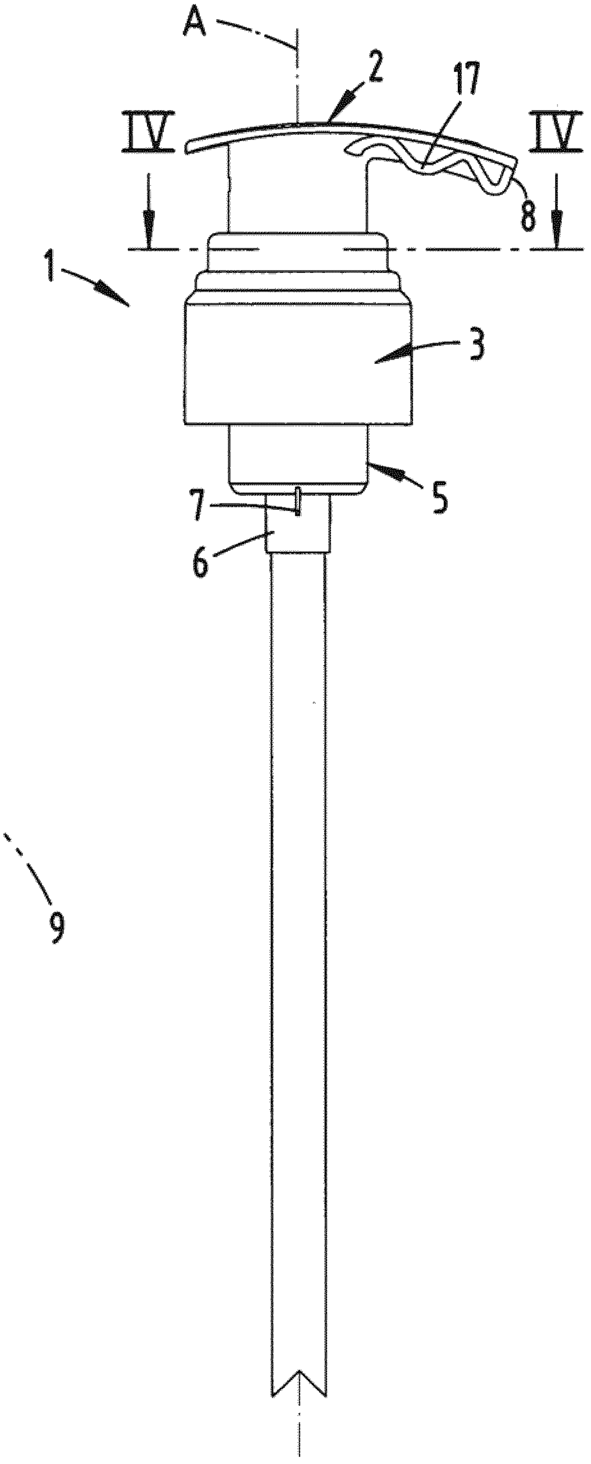
FIG. 2 the pump according to FIG. 1 in a side view.

With reference first to FIGS. 1 to 3 is shown and described a pump 1 with a pump head 2 and a pump housing part 3. The pump 1 further may have a suction tube 4 as shown in the embodiments. However, the pump 1 may also work without the suction tube 4. For example, the attachment part 51 as such described further below, could provide a suction part. In such embodiment the receptacle may have e. g. a piston limiting the fluid below and rising with pumping out of the fluid.

Below the pump housing part 3 a pump chamber part 5 is visible in FIGS. 1 through 3. The pump chamber part 5 may have in its lower part a hollow receiving part 6 for receiving and holding the suction tube 4. In the transition area between the pump chamber part 5 building the pump chamber with a greater inner diameter than has the receiving part, a rib 7, visible at the outside, may be provided for. The rib 7 may have a stabilizing and/or orientation function, e. g. for an orientation when assembling the pump 1.

The pump 1 described above and below is preferably a pump 1 having most or all parts as plastic parts. Further preferably, most or all of the parts are of polyethylene. Especially is preferred to have the restoring means, especially the bellows, made from polyethylene.

Such pump may have a dispense volume at a pumping stroke of some milliliters, for example 1.5 to 3 ml, more preferably 2 ml. Nevertheless, even greater volumes can be handled, such as for example 4 ml or more.

The pump head 2 has further an outlet opening 8.

The pump 1 may be assigned to a receptacle 9 shown by a dashed line in FIG. 1. The receptacle 9 may be of very different shape. The combination of the pump 1 with the receptacle 9 may be means of a screw adaption as shown in the embodiments. The adaption may also be e.g. by being crimped on or pressed on.

In the receptacle 9 a fluid 11 like a lotion fluid, a soap or similar may be contained, which is pumpable by means of the pump 1 out of the receptacle 9. The fluid will be dispensed through the outlet opening 8 in the pump head. The outlet opening 8 is the end of an outlet channel 10, now with reference for example to FIG. 7 in the pump head 2.

Figure 7:
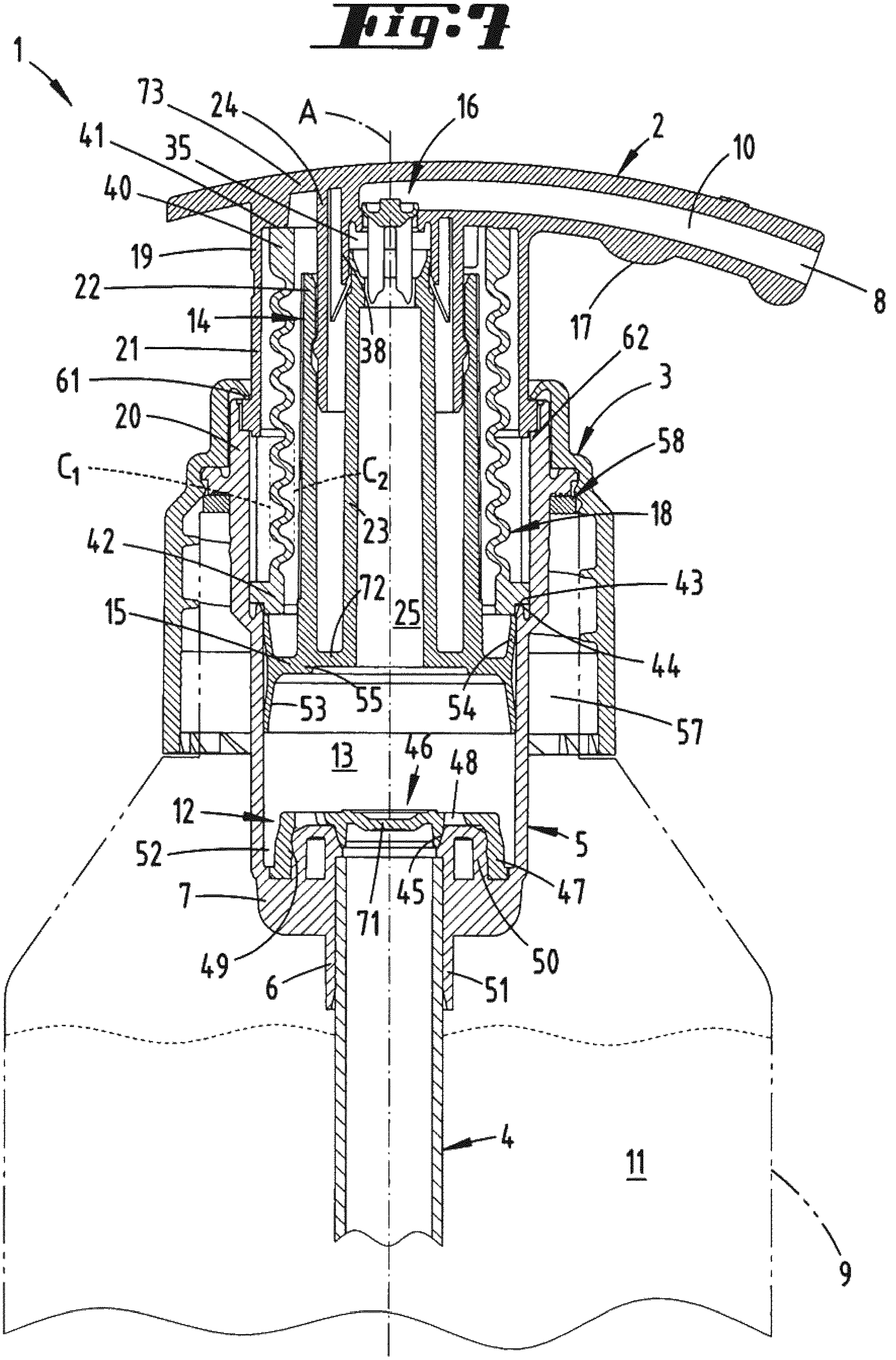
FIG. 7 a cross section of the pump in a locked state.

With further reference to FIG. 7, generally the fluid 11 to be pumped out of the receptacle 9 may flow through the suction tube 4 and through an inlet valve 12, being provided for in a lower part of a pump chamber 13, into the pump chamber 13. Further, upon a pumping stroke moving the pump head 2 together with a piston body 14 having the pump piston 15 from the starting position as for example shown in FIG. 7 down to a lower end position as for example shown in FIG. 11, the fluid will further flow through the internally hollow piston body 14 and an outlet valve 16 of the pump chamber 13 through the pump head fluid channel 10 for being finally dispensed at the outlet opening 8.

The pump head part having predominantly the pump head fluid channel 10 may have outside to the fluid channel 10 a stabilizing rib 17. Such stabilizing rib may be provided for with an extension in a length direction of the fluid channel 10 on both sides outside to the fluid channel 10. As shown and preferably, the stabilizing rib 17 has a wave-like pattern.

The pump 1 further may have a restoring means, which are given in a first embodiment as shown in this respect especially in FIGS. 1 to 13 by means of a bellows 18.

The pump 1 is preferably built by several in general cylindrical parts, being concentric to each other. They are all arranged preferably with a coincident middle axis, coincident with a geometrical axis A.

Figure 5:
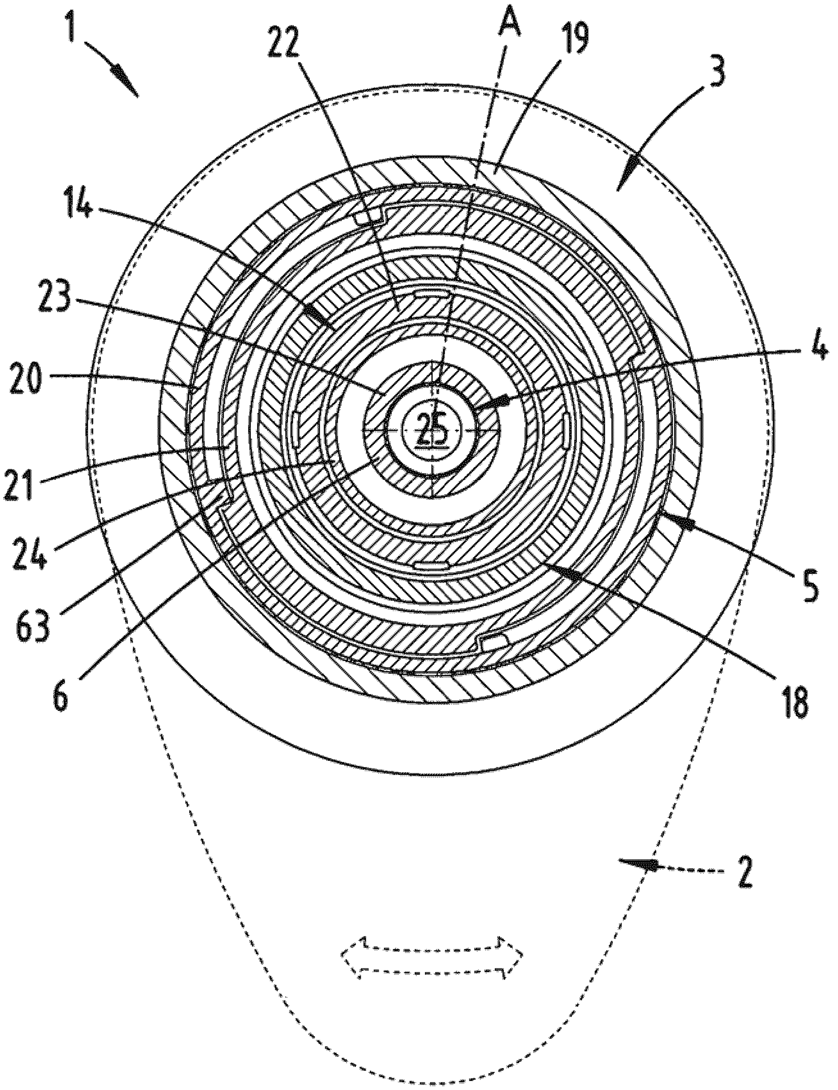
FIG. 5 a reproduction according to FIG. 4, however after having turned the pump head for about 90°.

As shown by the sections of FIGS. 4 and 5, preferably concentric to each other concerning the structure of the pump 1 at the section line Iv-Iv, as shown in FIG. 2, is preferably a first outermost, at the shown embodiment but only preferably in this respect, wall 19, provided for by the pump housing part 3. Inside and preferably next to the outermost wall 19 is visible an also preferably cylindrical receiving wall 20, at the shown embodiment, and preferably, being a part of the pump chamber part 5. The receiving wall 20 may receive a generally also preferably cylindrical pump head wall 21, extending downward from the pump head, see for example FIG. 7. The pump head wall 21 may be to a long vertical extent visible in a starting position of the pump heads 2 as for example shown in FIG. 7.

Preferably further radially inside to the pump head wall 21 are provided for the restoring means, at the embodiment of FIGS. 1 to 13 as already mentioned, provided for by the bellows 18. The bellows 18 has several bulges above each other which run in a zig-zag line. The bellows 18 can be also regarded as being generally cylindrical. Most specifically, see e.g. FIG. 7 one can imagine an inner and outer geometrical cylinder C1, C2, between which the bulges at least do extend. One or both of the shoulders may go inside and/or outside further than a respective cylinder when the cylinders are in touching engagement with the respective outermost parts of the bulges.

The restoring means could as well be provided for by a spring like a helical spring or coil spring, preferably a plastic spring as well, as for example shown in the embodiment of FIGS. 23 through 26.

Further preferably, preferably radially inside to the restoring means, here the bellows 18, are two also preferably cylindrical concentric walls 22 and 23, being preferably and especially at the shown embodiment in one piece, preferably material uniform, with the piston body 14. In the shown section further a second inner wall 24, being part of the pump head, is visible. The wall 24 is second with respect to the wall 21, being first in this respect. The second inner wall 24, as for example shown in FIGS. 7 and 10, may cooperate with the outer concentric wall 22 of the piston body 14 in order to provide the opening stroke of the outlet valve 16.

The inner concentric wall 23 of the piston body 14 provides the tube-like configuration of the piston body. The inner space 25 with the inner concentric wall 23 serves to transport the fluid upon a pumping stroke through the piston body and via the outlet valve into the outlet channel 10 from which the fluid is finally dispensed through the outlet opening 9.

The inner wall 23 and the outer wall 22 are combined by common foot part 72. The walls of the pump head are combined by a common ceiling part 73. Specifically it is preferred, that the ceiling part 73 over the circumference concerning the middle axis A is on different heights, namely at the location of the outlet channel 10 given by the bottom of the outlet channel 10 but otherwise preferably by a wall of the pump head which at once preferably provides an outer surface of the pump head, for receiving for example a pressing force from a user.

FIG. 5 shows the same as FIG. 4, however after having turned the pump head 2 for a certain angle around the central geometrical axis A of the pump 1. The turning angle is preferably about 90°. It can be however also different.

Figure 10:
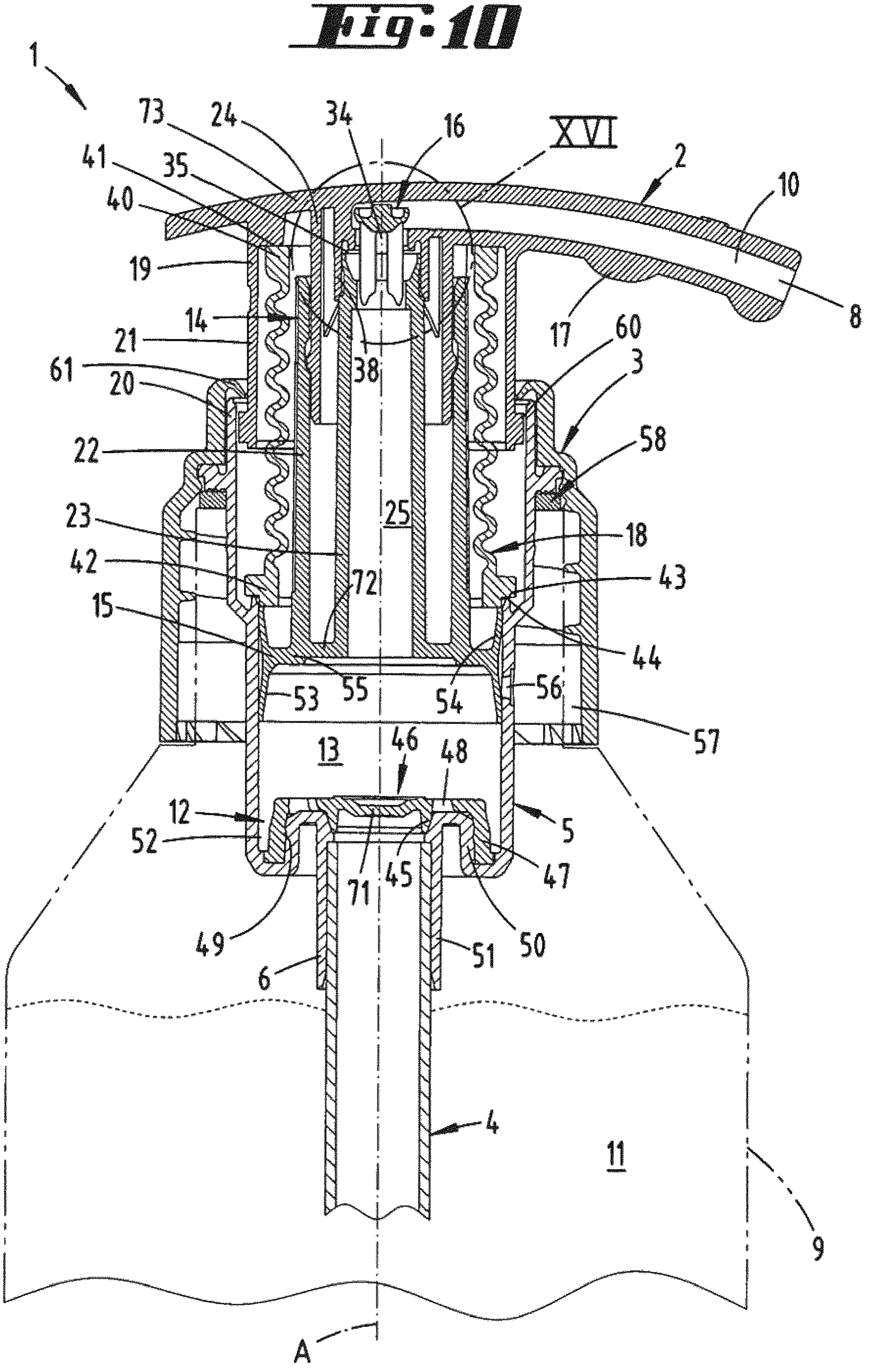
FIG. 10 a view according to FIG. 8, after having started a pumping stroke, with opened outlet valve.

By such a turning, a locking and unlocking of the pump head 2 in the upper position, as shown in FIGS. 7 and 10, is possible. With the locking of the pump head 2 in the upper position as shown in FIG. 7, it can be secured that during transport and other non-use, not inadvertently fluid is dispensed through the opening 9.

The specific design at the shown embodiment for the locking in said upper position is described further below with respect to FIGS. 9 through 22.

At the shown embodiment and preferably the piston body 14 is unitary, further preferably material uniform one piece made with the pump piston 15, wherein the piston body 14 especially provides the tube-like extension with the inner space 25 for delivering the fluid into the outlet channel 10 as described.

Further preferably, not necessarily combined with the preferred one piece design of the pump piston 15 and the piston body 14, the piston body 14 is unitary one piece with the outlet valve 16. As it is shown in more detail in FIGS. 15 through 17, the outlet valve 16 may consist of a disc-like valve part 26 which has preferably a circumferential outer upward protruding rim part 27. Preferably centrally to the disc-like plate part 26 can be provided for a stem part 28. The stem part 28 may further protrude upward over the rim part 27. The stem part 28 may serve as an upper stop in the opening position of the outlet valve 16. However, this opening position may additionally or instead also be provided for by an abutment of an inner wall, preferably the second inner wall 24, on an abutment shoulder 29 provided for in an upper part of the piston body 14, especially at the inner concentric wall 23 of the piston body.

As far as above and below is referenced in view of the shown pump 1 "above" or "below", this is always meant in respect of the fluid flow upon a pumping stroke. The fluid flows from below to above within the piston body and then preferably after having gone through the area of the outlet valve 16 generally horizontal and radially outward with respect to the central geometric axis A.

The outlet valve 16 further cooperates with a sealing rim 30 provided for in the pump head 2. Specifically, the sealing rim 30 is given by an opening 31 of the outlet channel 10 in the pump head. The opening 31 is preferably a short axial tube-like region in the pump head 2. The opening 31 is further given at the lower inner surface of the outlet channel 10. Such seen, the opening 31 is in the bottom of the outlet channel 10. The outlet valve 16 extends within, and at least in the opening position, through the short axial tube-like region.

Figure 15:
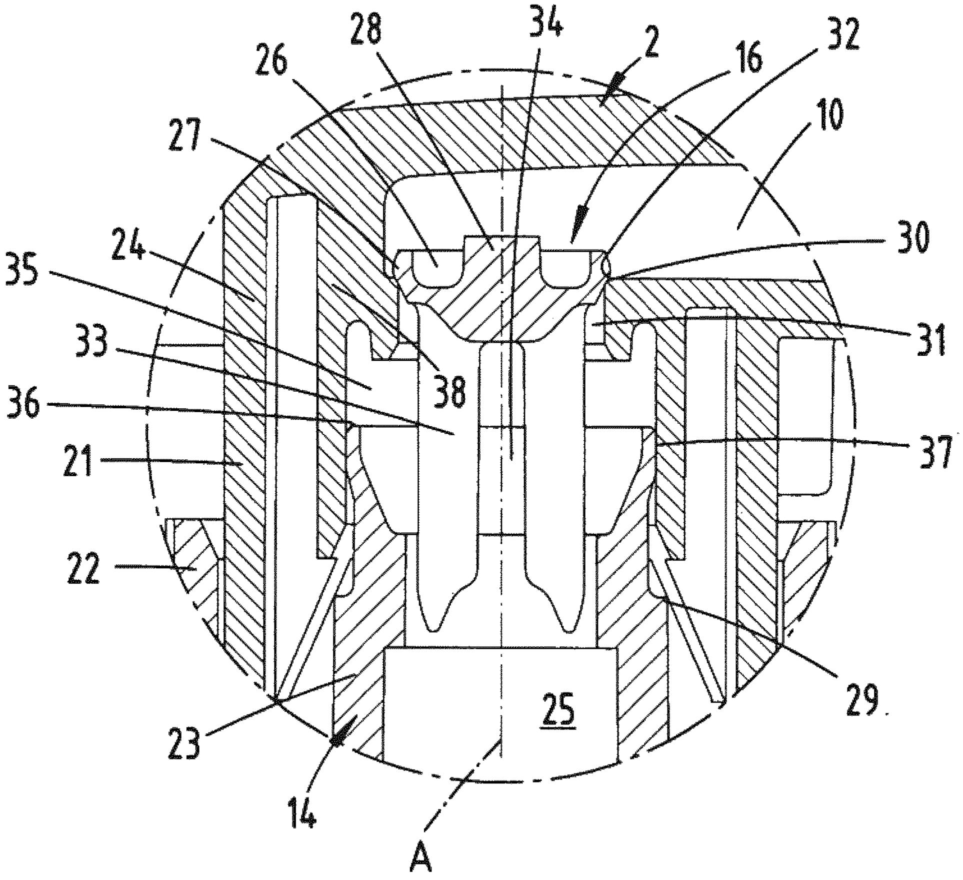
FIG. 15 an enlarged reproduction of the area shown by the line XV-XV in FIG. 8.
Figure 16:
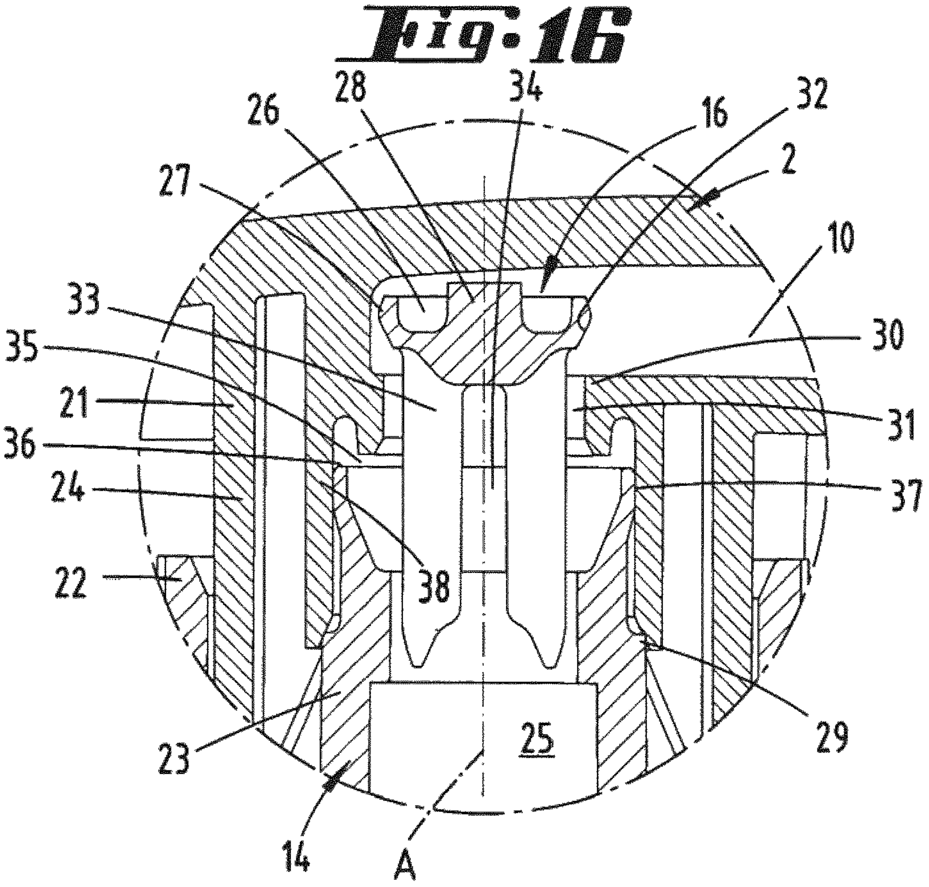
FIG. 16 the area according to FIG. 15, with the outlet valve, the outlet valve being in an open position.

The disc-like valve part 26, in one of the embodiments, see especially FIG. 15, lies on said rim 30 by means of an edge 32 designed at the outer surface of the disc-like valve part 26. As one can see especially in FIG. 15, the outer surface is in the shown cross section convex designed, providing such the edge 32.

Probably, as also shown in FIG. 15, in the closed position of the outlet valve 16 according to this embodiment, an upper part of the disc-like valve part 26 is still within the pump channel 10.

Figure 17:
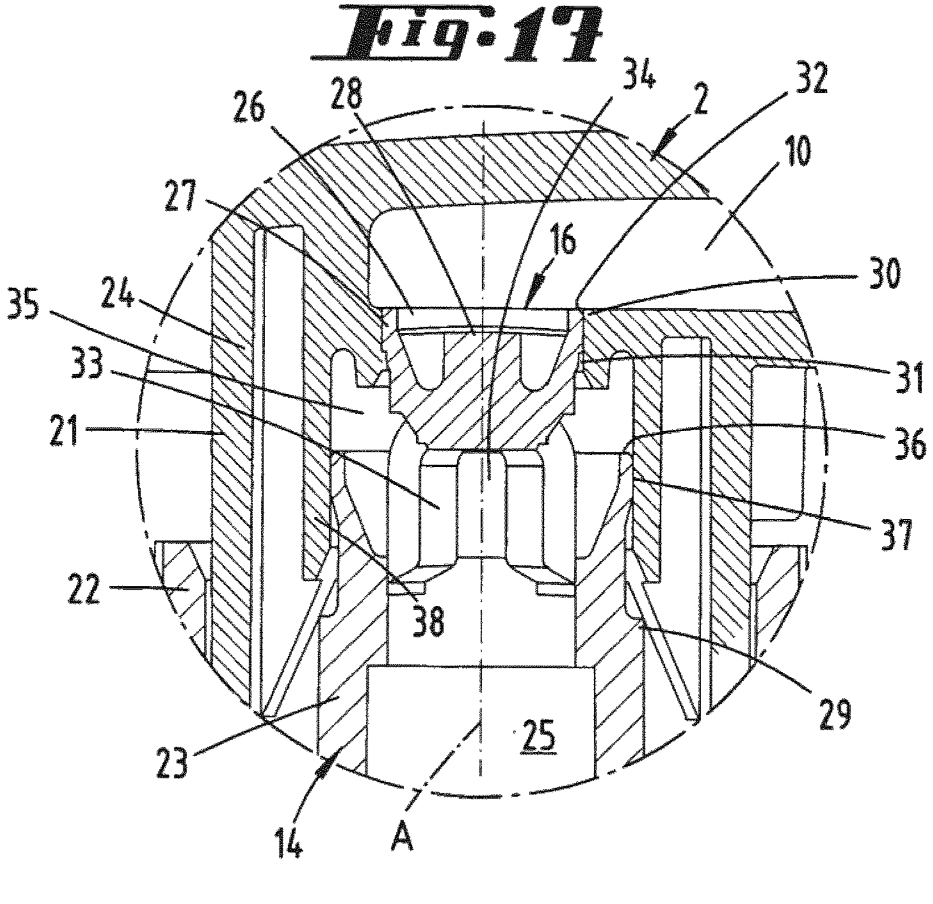
FIG. 17 a reproduction according to FIG. 15, however with a modified outlet valve.

The sealing effect is given by lying on each other of the disc-like valve part and an opening edge of the opening, with some bias provided for preferably by the restoring means, by surfaces overlapping each other, giving a comparatively small edge contact. In the alternative, see e. g. FIG. 17, there is due to some compression of the at least in this case elastic disc-like valve part 26, whereby the disc-like valve part 26 may however be elastic in both alternatives, a comparatively broad sealing contact by surfaces lying on each other on a rather cylindrical area.

The disc-like valve part 26, and this is given for both the embodiments, in this respect described, has lower, one or more pillar parts 33, which combine the outlet valve 16 with the piston body 14, preferably with the inner concentric wall 23 of the piston body 14. The pillars, in case there are several pillar parts 33, leave a free space 34 between them and a free space 35 around them for allowing the fluid to flow around the pillar parts 33 and, in the opening position of the outlet valve further around the outer surface of the disc-like valve part 26 for finally going into the pump head fluid channel 10.

In case of one pillar part 33, the one pillar part 33 is also such arranged that it allows the flowing around of the fluid in the indicated way.

The one or several pillar parts 33 extend from an area within the inner concentric wall 23 up to above an upper rim 36 of the piston body, especially the said inner concentric wall 23. The disc-like valve part 26 is preferably, as shown at the embodiment, extending with a distance to said upper rim 36, above the upper rim 36.

The upper rim 36 may be built by a flexible lip part 37 providing further the upper end of the piston body 14, especially the said inner concentric wall 23. The flexible lip part may be sealingly engage an inner surface of a respective skirt part, preferably the third inner wall part 38 of the pump head 2.

The restoring means, preferably the bellows 18 or the spring 39 as shown in FIGS. 23 through 26, are preferably in an abutment engagement with the pump head 2 and the pump chamber body 13. With the pump head 2 the abutment is at the upper end of the restoring means and with the pump chamber part 5 at the lower end of the restoring means. Instead of the pump chamber part 5 there could be also another pump part for providing the abutment of the restoring means at the lower end of the restoring means.

The upper abutment is given by an enlarged abutment area 40 of the restoring means. Especially in case of a bellows as shown. The abutment area 40 is the shoulder of the bellows mentioned further above.

The pump head provides a circumferential surface 41, as the counter abutment surface for the abutment area 40. The surface 21 may extend at least in part more or less at a right angle to the axis A as it does preferably a respective surface of the abutment area 40 as well.

Figure 11:
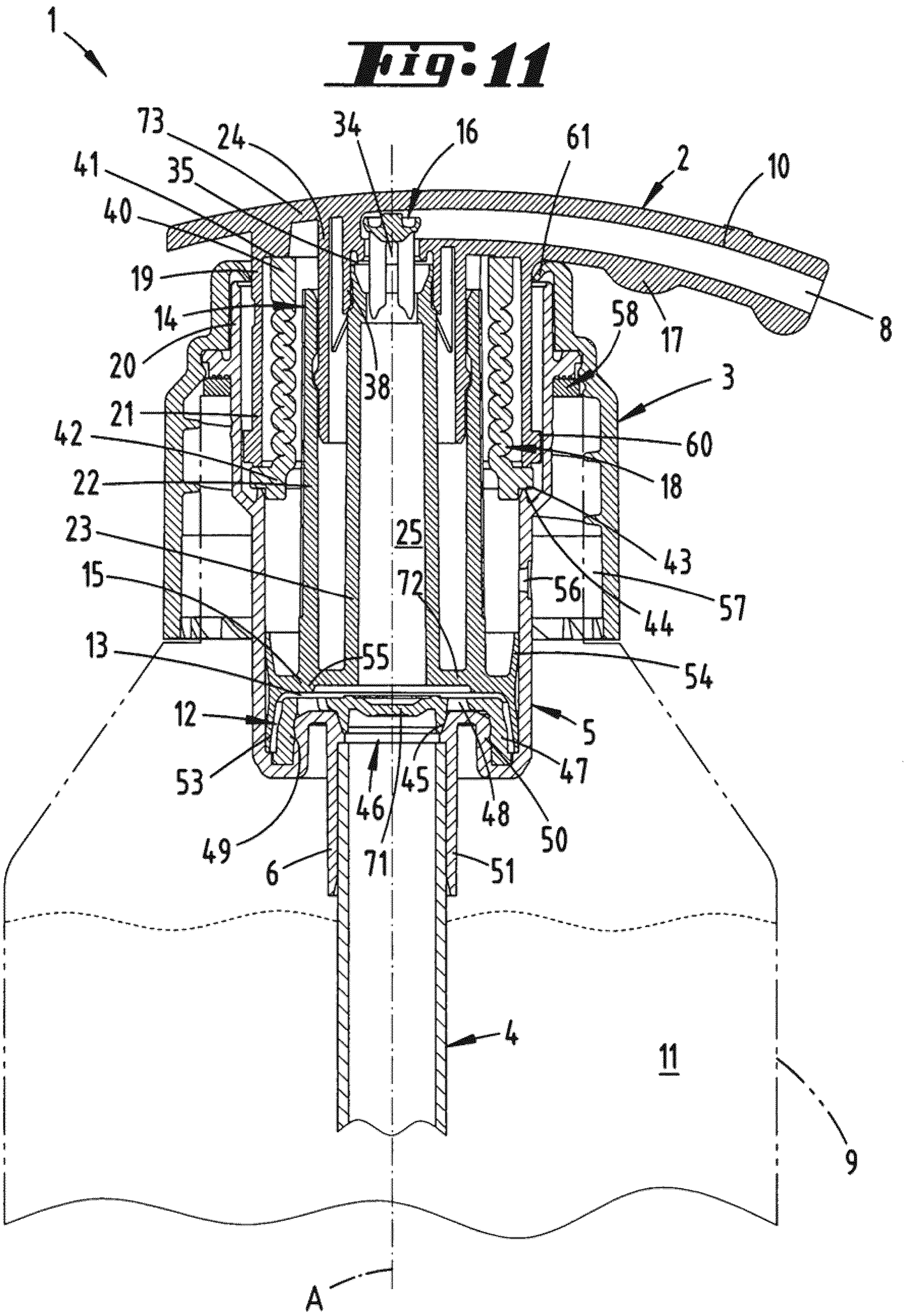
FIG. 11 a view according to FIG. 10, in a lower end position of the pumping stroke.

This circumferential abutment surface 41 may be at a part of its circumferential extension step-like, as visible for example in FIG. 10, left part, and over a further part it may be a bottom of a channel-like design given between two lower skirt parts of the pump head, as shown in the right part of FIG. 10 or FIG. 11 respectively.

The lower abutment part 42 of the restoring means, especially the bellows, may be designed with a corner 43, opening to the outside. In this corner might be received an abutment rim 44 as part of the pump chamber part or as part of another pump part. The restoring means are centralized hereby in the lower part and further nevertheless upon a pumping stroke a certain tilting of the lower part, even given possibly in very small degrees, is possible.

Figure 9:
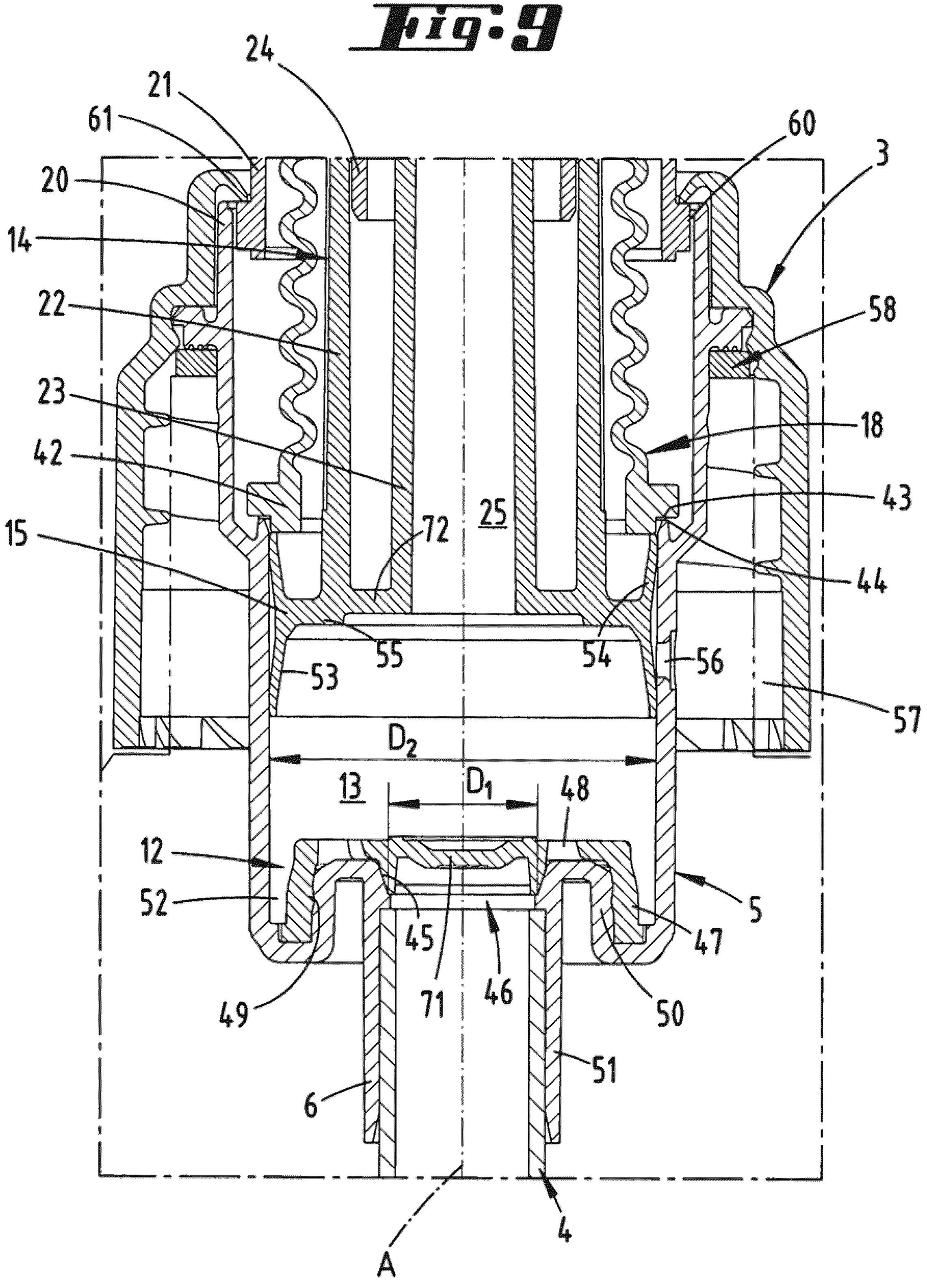
FIG. 9 a partial, slightly perspective view according to the line IX-IX indicated in FIG. 8.

The inlet valve 12 is further especially shown in FIG. 9. The inlet valve 12 at this first embodiment has a preferably inner sealing part 71 being preferably a bottom of an in general pot-like sealing element 46 with a comparatively larger diameter D1 providing further preferably in terms of a pot wall a downward extending sealing lip 45, extending into an axial opening in the bottom part of the pump chamber. The diameter D1 is comparatively large in view of the diameter D2 of the pump chamber 13 as such, being the same diameter D2 along which the pump piston is moving. The relation D1/D2 is preferably between 0.3 and 0.5, more preferably about 0.4.

The inner sealing part 71 of the inlet valve 12, having the said diameter D1, is bound to an outer attachment part 47 of the inlet valve 12 by means of flexible arms 48. A flexible arm 48 may extend partly in circumferential direction in order to have a greater length of the flexible arm 48. The inner sealing part 71 may be seen as the bottom of the pot like sealing part 46.

The outer attachment part 47 is sleeve-like and extends further below to the inner sealing part 71, especially thereby further below concerning inner sealing part 71. An inner surface of the attachment part 47 is preferably structured with one or more ribs 49, in order to engage an outer surface of a rising wall part 50 of a bottom of the pump chamber. The rising wall part 50 is preferably in the section shown for example in FIG. 9 an outer leg of an altogether U-shaped wall extending with its inner leg into an attachment part 51 for holding or attaching the suction tube 4 as far as provided for. Instead it could be also only the transition part into the receptacle or specifically a storage room of the receptacle.

The attachment part 47 further leaves a circumferential space 52 between an outer surface of the attachment part 47 and an inner surface of the pump chamber. This circumferential space may serve to receive a sealing lip, in the given case a lower sealing lip 53 of the piston, allowing the piston to move in the lower end position upon a pumping stroke.

Preferably as shown in the embodiment, the piston has two sealing lips 53 and 54, namely a lower sealing lip 53 and an upper sealing lip 54. The sealing lips extend starting from a plate-like middle portion 55 of the piston in opposite directions.

In the upper position of the piston and the starting position of the pump head, the sealing lip, in the given case the upper sealing lip, may rest against a lower surface of the abutment part 42 of the restoring means, especially the bellows or the spring. This allows to provide a further sealing in view of fluid not flowing in view of that fluid may not flow to the outside, out of the pump chamber 13. Instead or additionally there is also given an abutment of the piston or a piston body respectively in the upper starting position. In this case, additionally possibly to an abutment of the skirt rim 60 at the stop 61 (see also below).

In the pump chamber body is further preferably provided for an opening 56, which is further preferably in the non-actuated position, the upper position of the pump head and the piston body, overlapped by one or both of the said sealing lips 53 and 54 of the piston. The overlapping is preferably given by only one of the lips, however an in between space between an outer surface of the lips and possibly an in between piston part and an inner surface of the pump chamber body having the opening might be limited by both the lips. Therefore, in this position, outside air may not come into the pump chamber. However, in a lower position of the piston body and the pump head, as for example shown in FIG. 11, the opening 56 is freed from the overlapping and air may flow out given by the compression and further, be sucked back over a certain way of the piston body and the piston when moving from the lower end position to the starting position. Such air may flow through the attachment between the pump housing part 3 and into the receptacle, for compensating for fluid dispensed.

The receptacle 9 may have a neck 57 as indicated in FIG. 7. Between an upper surface of the neck 57 and the respective pump part, at the given embodiment a shoulder of the pump chamber part 13, a sealing ring 58 may be provided for.

Figure 6:
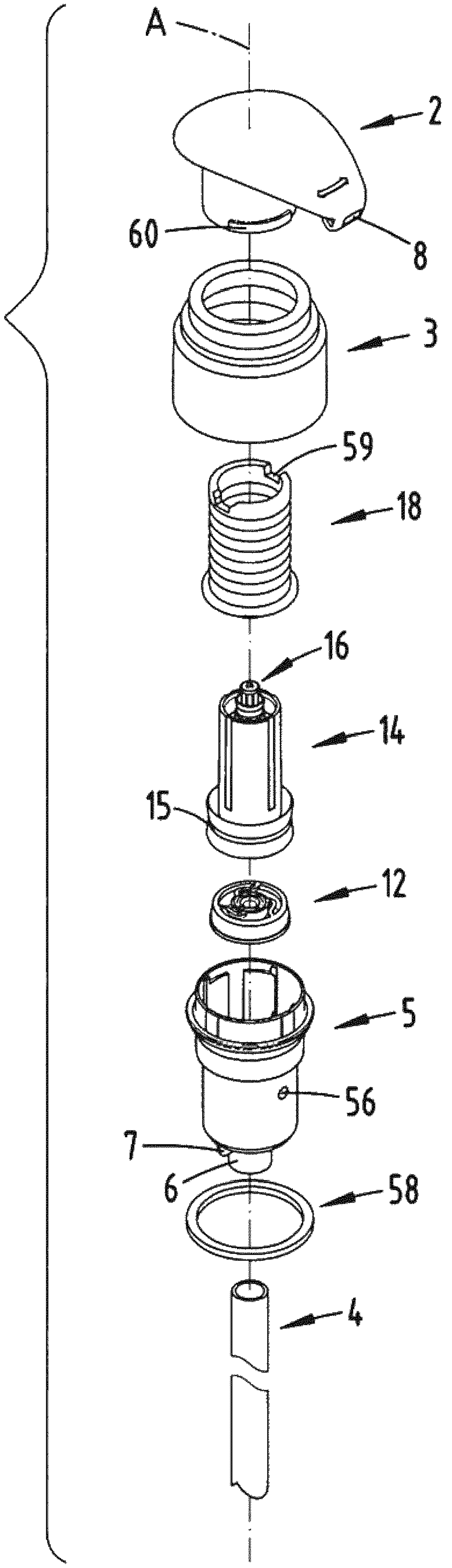
FIG. 6 an explosion view of the pump according to FIGS. 1 to 5.
Figure 6A:
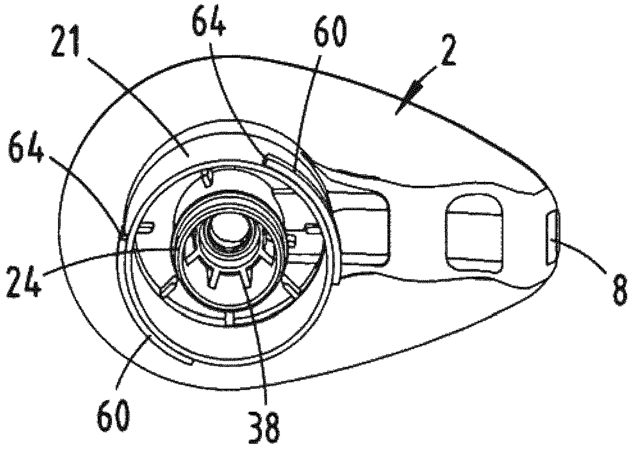
FIG. 6*a* a perspective view of the underside pumping head.

As it is for example visible and shown in FIG. 6, the restoring part, for example the bellows 18 or the spring 39 may have one or more orientation notches 59 for having some kind of circumferential fixation of the restoring means in the assembled state. This might be of interest for example in view of possible circumferential forces arising from the pumping stroke within the restoring means. This especially in case the bellows or the spring have circumferential extending elements which are helical or thread-like designed.

Figure 8:
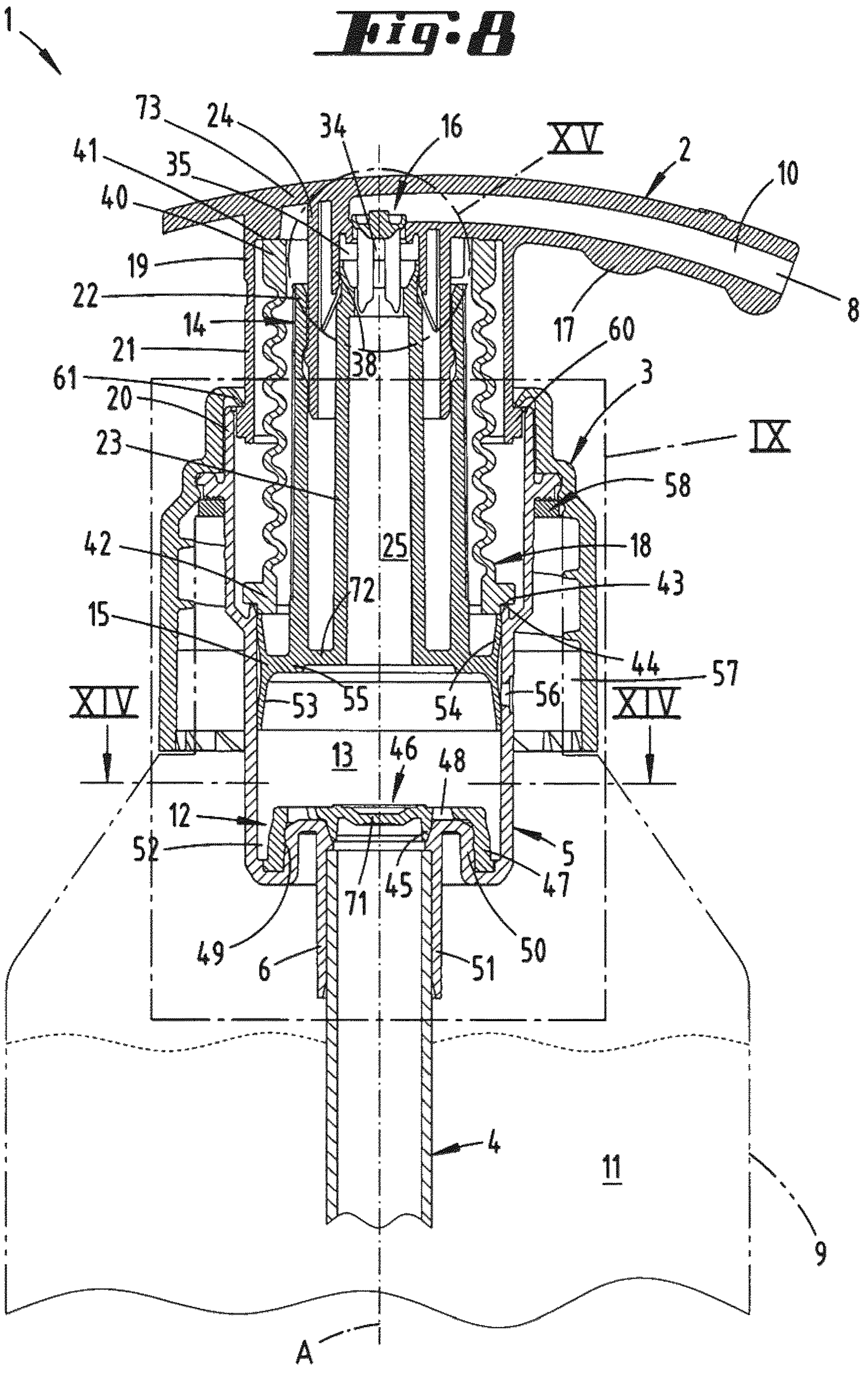
FIG. 8 a cross section according to FIG. 7, however in a not locked state.

When performing a pumping stroke, the starting position, the upper position of the pump head as well as the piston with the piston body is positioned as shown for example in FIG. 8. Thereafter, upon a first movement of the pump head, the position as shown in FIG. 10 will be given. Especially the upper free end of the concentric wall 22 may rest against an abutment part being provided for at the pump head (not hatched in FIGS. 10 and 16). This is preferred to determine this position and the abutment will be maintained then for the further stroke as well. Nevertheless, there may be some further kind of abutment between the second inner wall 24 and a respective shoulder configuration of the concentric wall 23.

The concentric wall 23 may also have, as visible also from FIG. 10, a circumferential receiving room for a respective horizontally circumferentially running round rib of the second inner wall 24. This is preferably but only some guiding purposes, not for predominantly having the abutment engagement between the head part and the piston body 14.

Figure 12:
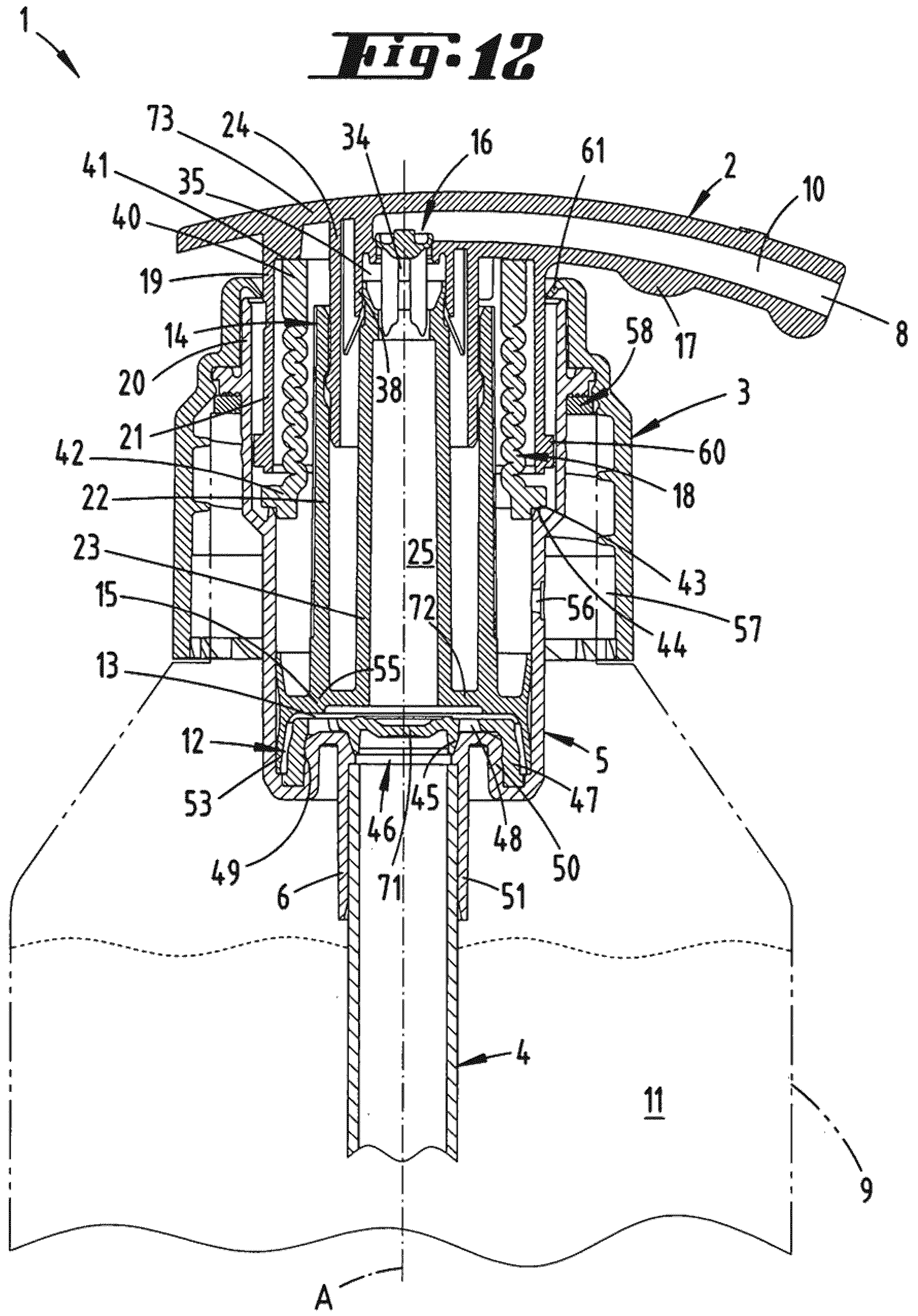
FIG. 12 a view according to FIG. 11, after having removed a pressure on the pumping head, the pumping head is starting together with the piston body the movement from the lower end position into the starting position.
Figure 13:
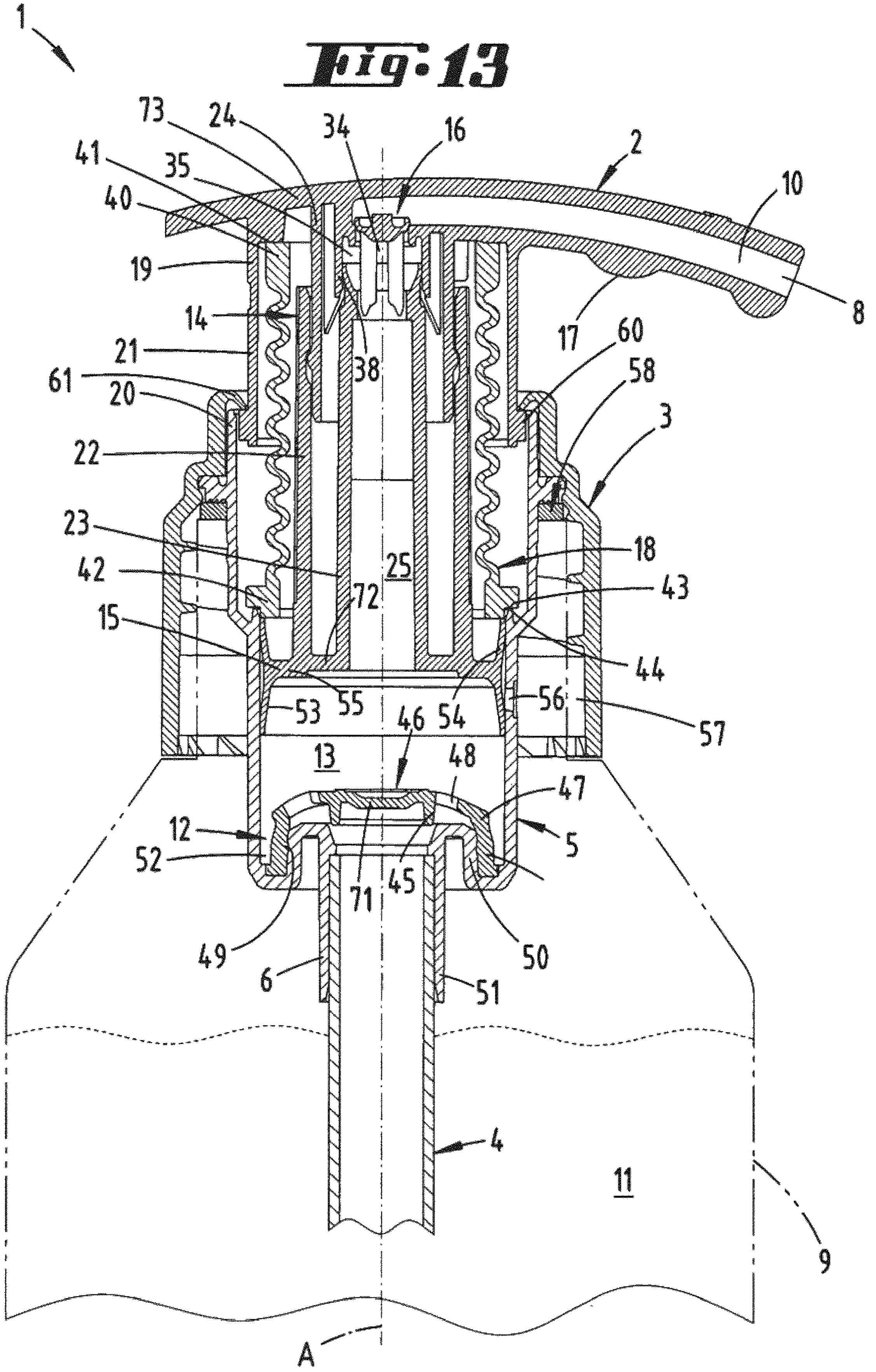
FIG. 13 a reproduction according to FIG. 2, nearly at the end of the return stroke, near the upper end position, the inlet valve being still in an open position.
Figure 14:
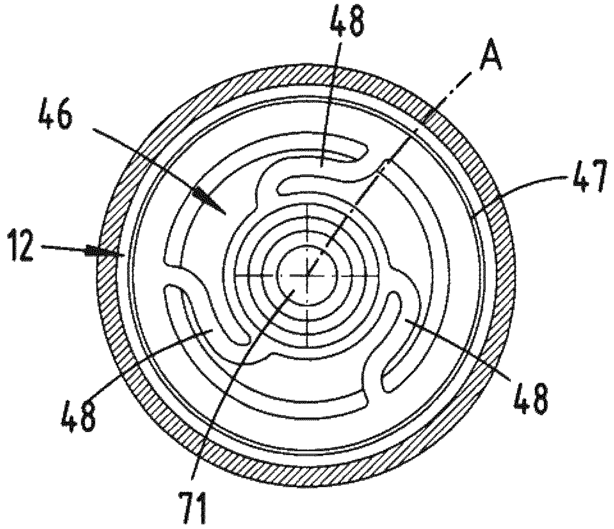
FIG. 14 a cross section view according to the line XIV-XIV in FIG. 8.

Then the pumping stroke will be performed until the lower end position shown in FIG. 12 is reached. In FIG. 12 already the outlet valve has closed again but the inlet valve has not yet opened. In FIG. 13, at the end of the return stroke, the inlet valve is still shown in the pen position such that fluid is filled again into the pump chamber 13.

Thereafter, the inlet valve will close automatically.

With reference especially to FIGS. 19 through 22, more specifically the locking of the pumping head in the upper starting position is explained.

The pump head 2, for example and preferably at its pump head wall 21, may have a skirt rim 60, being received in the locked position as also shown in FIG. 7 between a stop 61, preferably provided for at the pump housing part 3, and a shoulder 62 being provided for at the preferred embodiment at the pump chamber part 5. The vertical and circumferential space between the stop 61 and the shoulder 62 provides the inner horizontal space mentioned above. The shoulder 62, as visible in FIG. 20, may consist of several shoulders 62, which can be an upper surface of a respective rib extending to the radial inner from an inner surface of the pump chamber body 13 or another pump part providing this shoulders.

The locked position is further preferably limited by a stop 63, also provided for at the pump chamber part 5 or another respective pump part. An end surface 64 of the skirt rim 60 may rest against the stop 63 when the pump head 2 is fully turned in the locked position.

Figure 22:
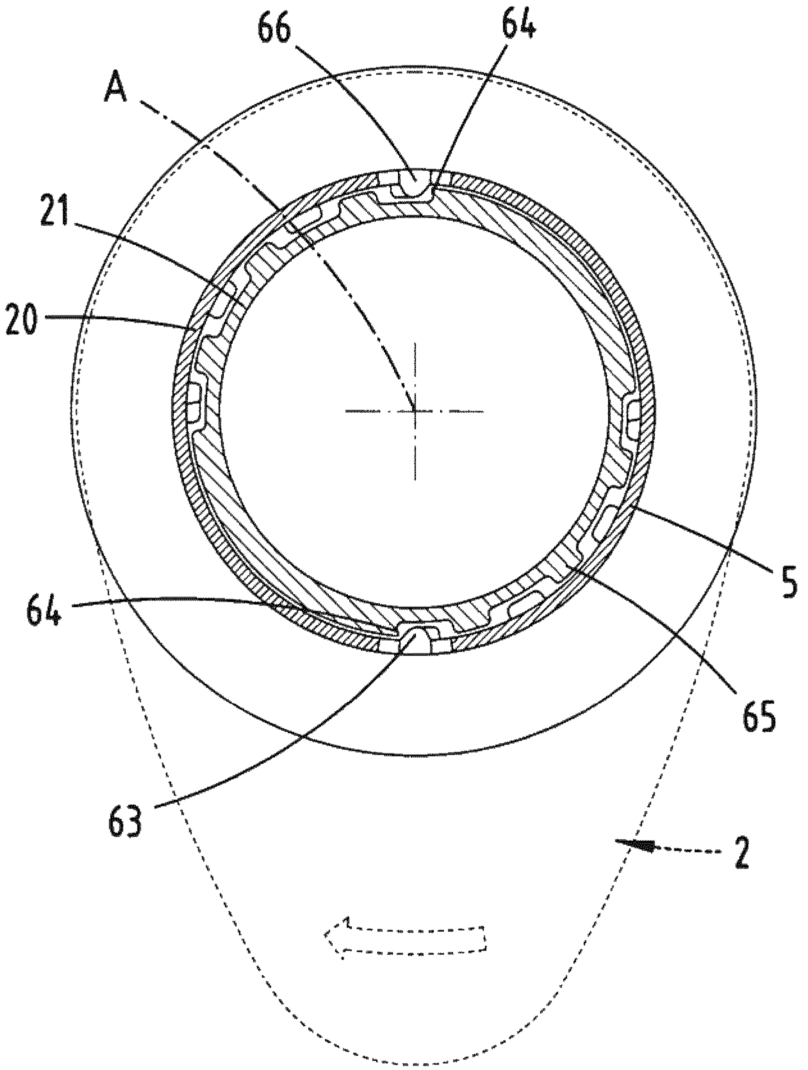
FIG. 22 a reproduction according to FIG. 21, in a cross section indicated by the line XXII-XXII, the pump head being in an unlocked position after having been turned for about 90°.

In the unlocked position, as shown in FIG. 22, there might be respective protruding protrusions 65 at the respective skirt part of the pump head, facing outwards, which may register with the ribs providing the shoulders 62 for allowing a certain guiding, stable in circumferential direction for the pump head upon a pump stroke. Preferably, the protrusions 65 are provided for at a same height as the skirt rim 60.

There might be provided for a further stop 66, limiting the turning of the pump head into the unlocked position.

The stops 63 and/or 66 may be overrunable by the skirt rim 60 and/or the protruding ribs 65, which at once may provide the user with a sensitive reaction that he is turning the pump head ratchet like. The protrusions 65 may also be provided for below in terms of height to the skirt rim 60 such that only the skirt rim 60 provide the user with the said reaction.

At the embodiment shown in FIGS. 23 through 26 is first of importance that the inlet valve 12 is raised for a great length L above a bottom of the pump chamber. The length L might be in the range of one times to two times of the diameter D2, especially between 1.1 to 1.5 of the diameter D2 and more preferably, about 1.5 of the diameter D1.

The arrangement of the inlet valve 12 this way allows first for a relatively small circumferential space around the upstanding wall 67 arising from the bottom of the pump chamber and with the circumferentially preferably completely surrounding valve part 68, which is tube-like surrounding the wall 67. The said reduced space allows for a reduced pump chamber volume such that the remaining fluid in the pump chamber as long as no pumping stroke is made, is comparatively low. Nevertheless a preferably used receiving space for the piston and part of the piston body during a pumping stroke is given.

This is also given additionally or instead by the said comparatively high upper position of the inlet valve 12 in view of the outlet valve 16.

The inlet valve 12, also in view of what is described concerning the first embodiment, with its valve part 68 is preferably made of flexible plastic material such as for example TPE, a thermoplastic elastomer.

Figure 18:
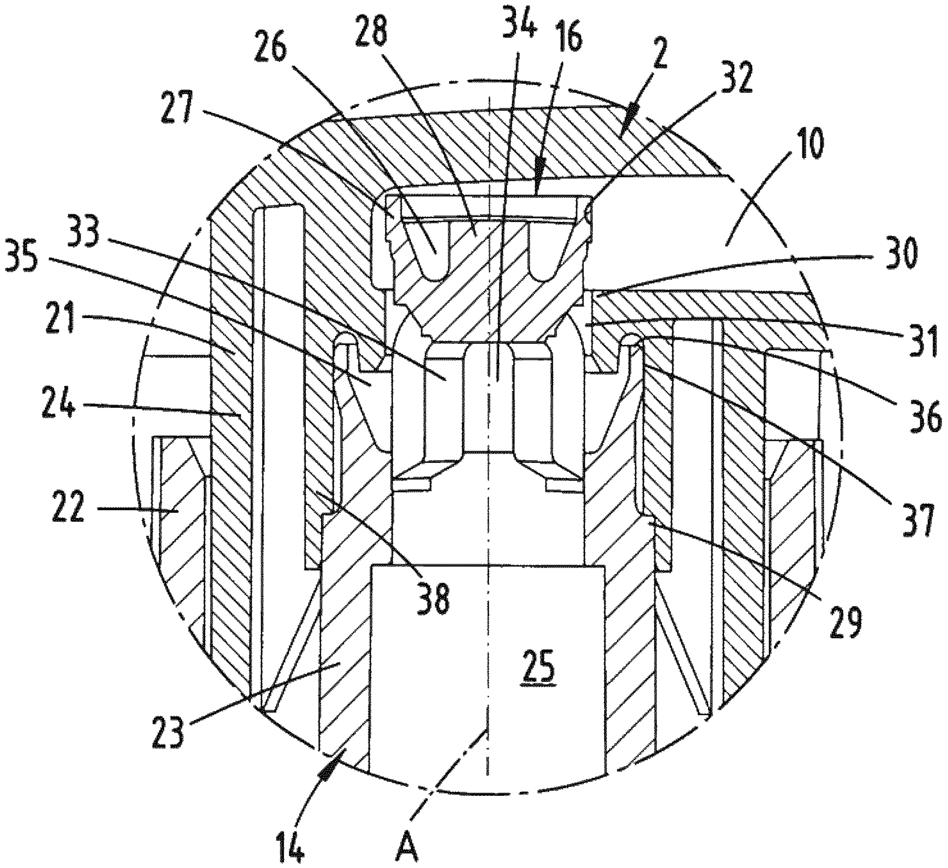
FIG. 18 the outlet valve according to FIG. 17, in an open position.

At this further embodiment is also shown a further embodiment of the outlet valve 16, as it is shown in more detail in FIGS. 17 and 18 in the closed or open position respectively. This outlet valve 16 differs from the first described outlet valve 16 in that the disc-like valve part 26 is even more bowl-like shaped and is preferably completely received in the opening 31 in the closed position of the outlet valve 16 as shown in FIG. 17. Further, it might be, which is also possible for the first explained embodiment of the outlet valve, that an upper surface of the disc-like valve part 26 may serve as a stop for the opening position of the outlet valve, as shown in FIG. 18. The stem part 28 therefore is at this embodiment not extending upwards to the upper surface of the disc-like valve part 26. However, in both embodiments, the stem part 28 provides a stabilization of the disc-like valve part 26. The embodiment of the outlet valve according to FIGS. 17 and 18 might especially by preferred in case higher opening forces are required. This might be combined with a higher sealing efficiency.

The outlet valve of this embodiment may also be given at the first embodiment described, without having at one the inlet valve as it is given preferably in this second embodiment.

Figure 23:
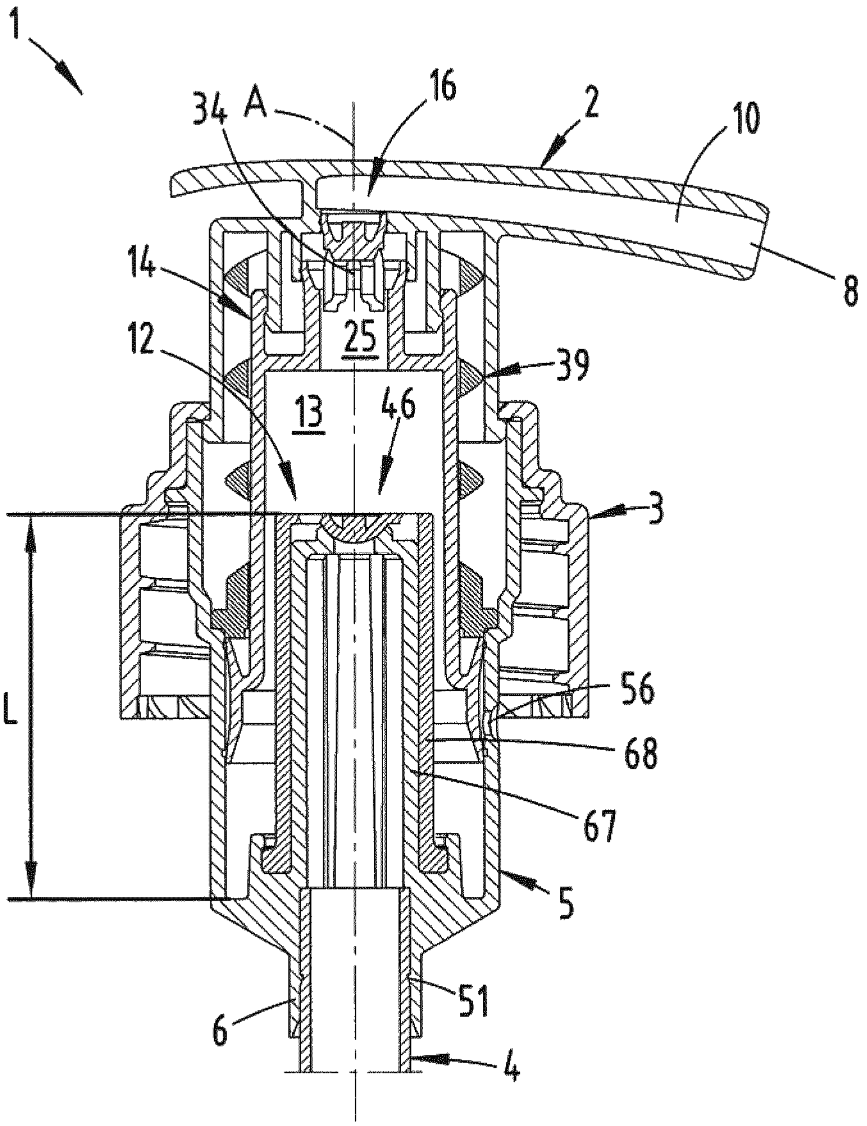
FIG. 23 a cross section of the pump according to FIG. 7, with a different embodiment of especially the pump piston body and the pump chamber bottom with the inlet valve.
Figure 24:
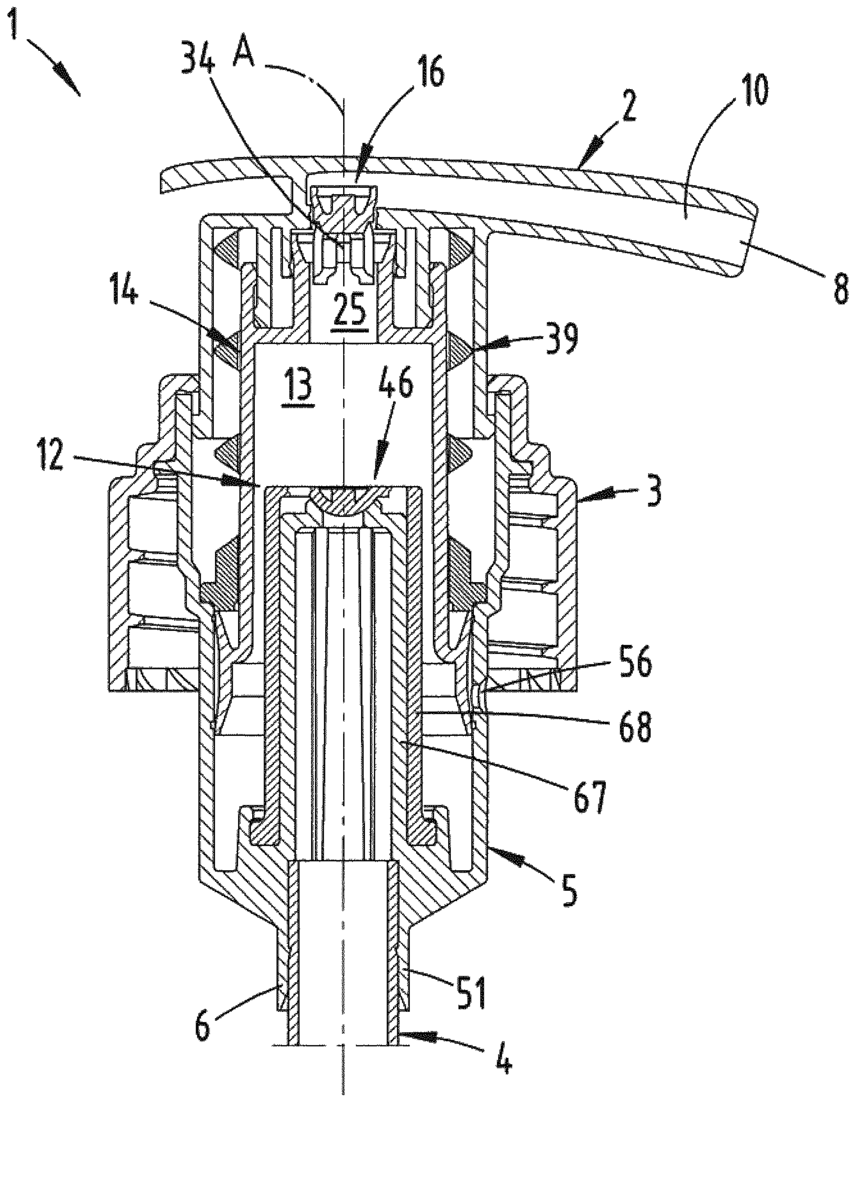
FIG. 24 a representation according to FIG. 22 after initiating a pumping stroke, the outlet valve being in an open position.

FIG. 23 shows the upper starting position in view of a pumping stoke of this embodiment of the pump 1. In FIG. 24, the pumping stroke has been initiated and as it is in principle also given with the first embodiment, the pump head 2 has moved somewhat with respect to the piston body 14 such that the outlet valve 16 has moved into the open position according to FIG. 18.

Figure 25:
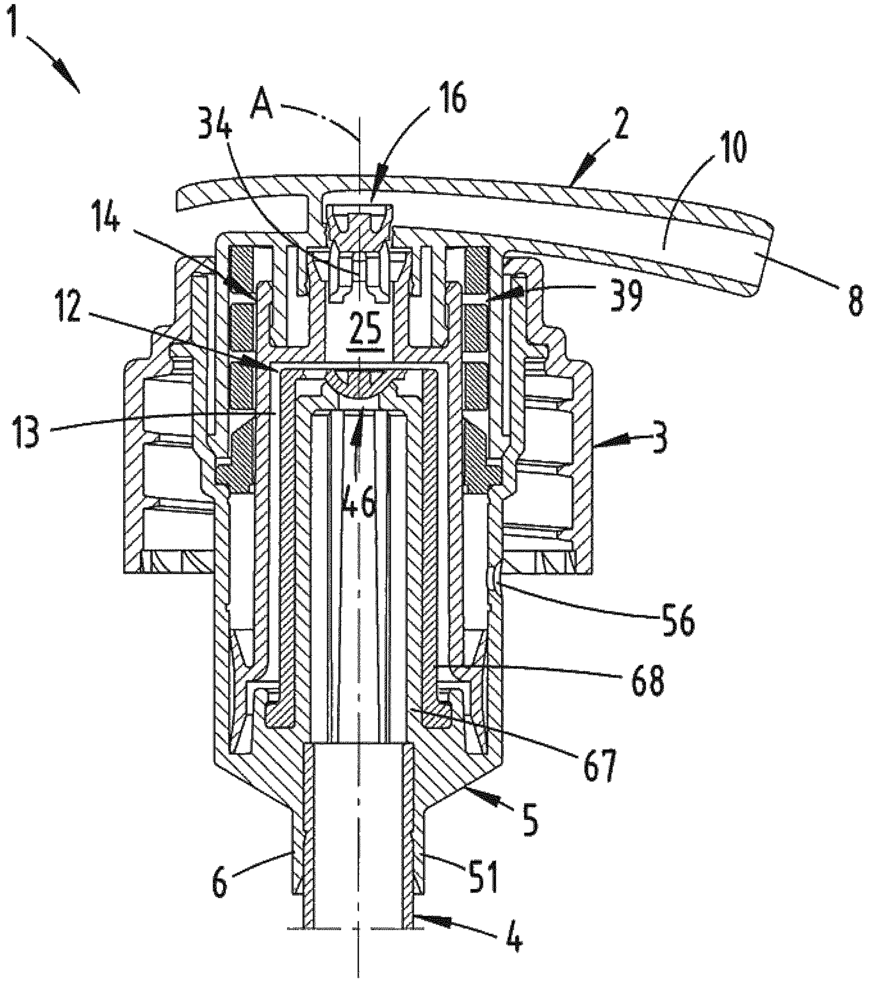
FIG. 25 a representation according to FIG. 24, the pumping head and the piston being in the lower end position.
Figure 26:
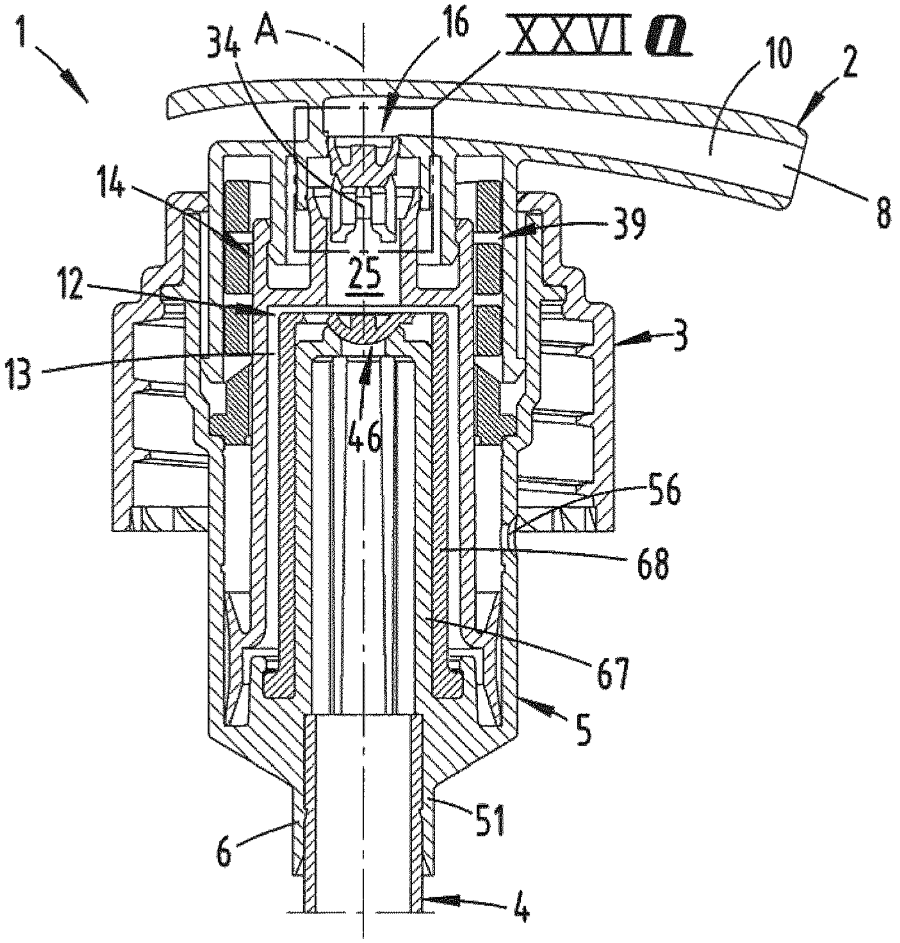
FIG. 26 a representation according to FIG. 25, after having initiated a return stroke, the outlet valve being in a closed position and the inlet valve in an open position.

In FIG. 25, the lower end position of the pumping stroke or the lower end position of the pump head 2 and/or the piston body 14 respectively is shown. The inlet valve 12 is still in the closed position. Upon initiating the return stroke, which is shown in FIG. 26, the outlet valve 16 returns into the closed position and the inlet valve 12 is in the open position such that due to the movement of the piston body fluid might be sucked into the pump chamber upon this return stroke.

Figure 26A:
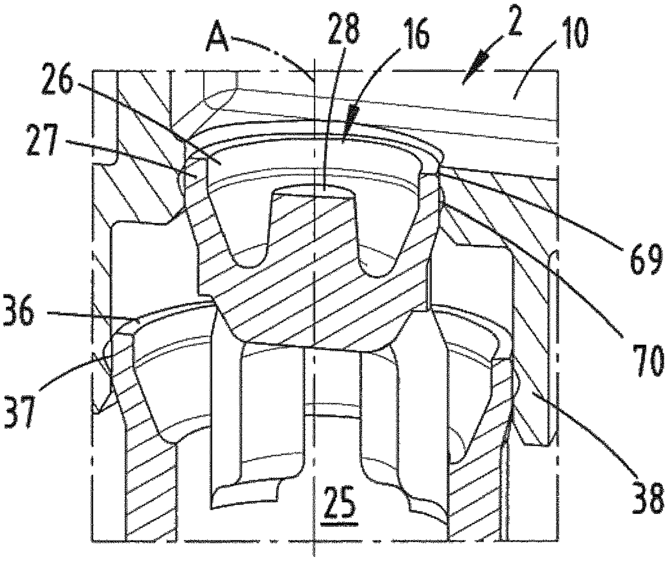
FIG. 26*a* an enlarged reproduction of the area line 26*a* in FIG. 26, showing the outlet valve in the closed position.

The closed position of the outlet valve 16 is shown in more detail in the further enlarged view of FIG. 26*a*. Especially is preferred that the opening 31 provides for one or more edges 69 and 70, having in between a cylindrical sealing surface, engaging the outer surface of this disc-like valve part 26 in said closed position of the outlet valve.

With respect to FIGS. 27 through 30 a further possible embodiment concerning locking the pump head in the upper starting position is described. The pump head wall 21 is provided for at the outside with one or two skirt rim 60. Preferably, as it is shown in the said figures, the skirt rim 60 of this embodiment has a comparatively great height in axial direction of the axis A. The height might be 25% up to 50% of the circumferential length of such rim 60. The height might be also lower, e. g. 15 to 25% of the circumferential length of such rim 60. In this respect, the circumferential length is preferably about 90°.

Figure 19:
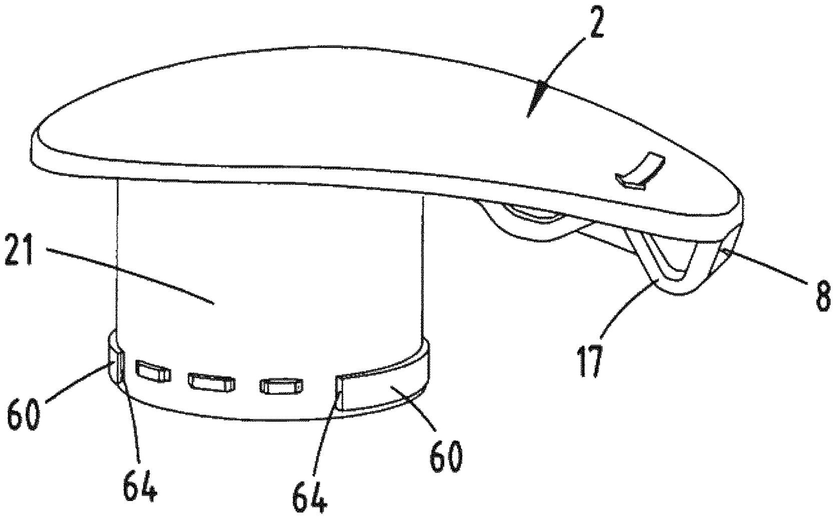
FIG. 19 a perspective view of the pumping head.
Figure 20:
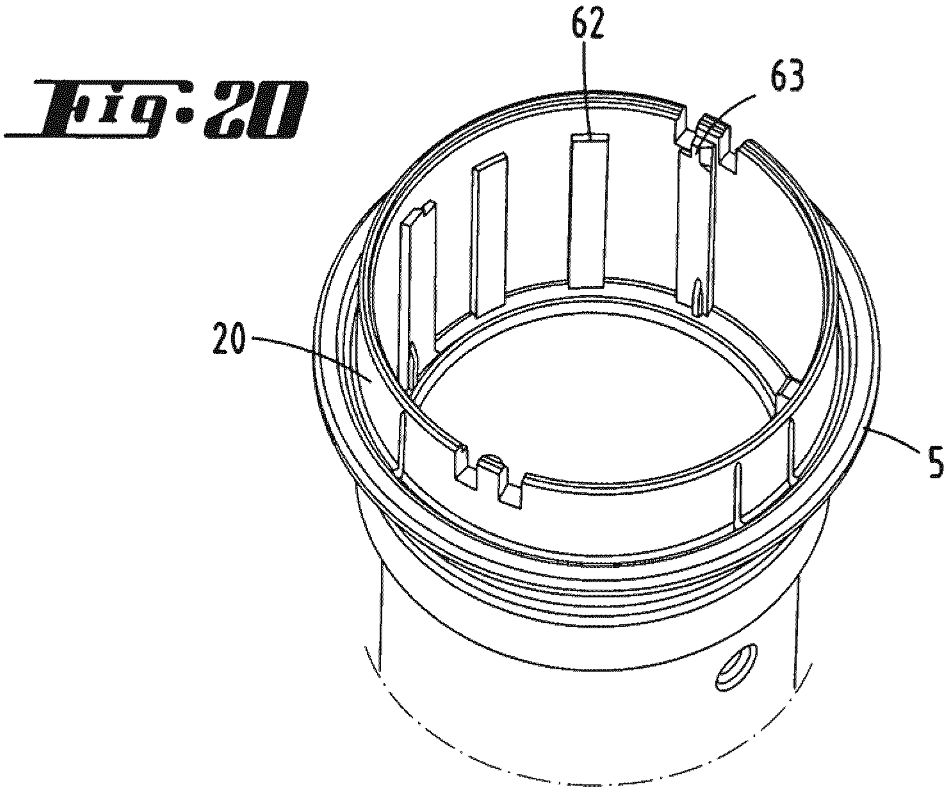
FIG. 20 a perspective view of a pumping part, seen from above.
Figure 21:
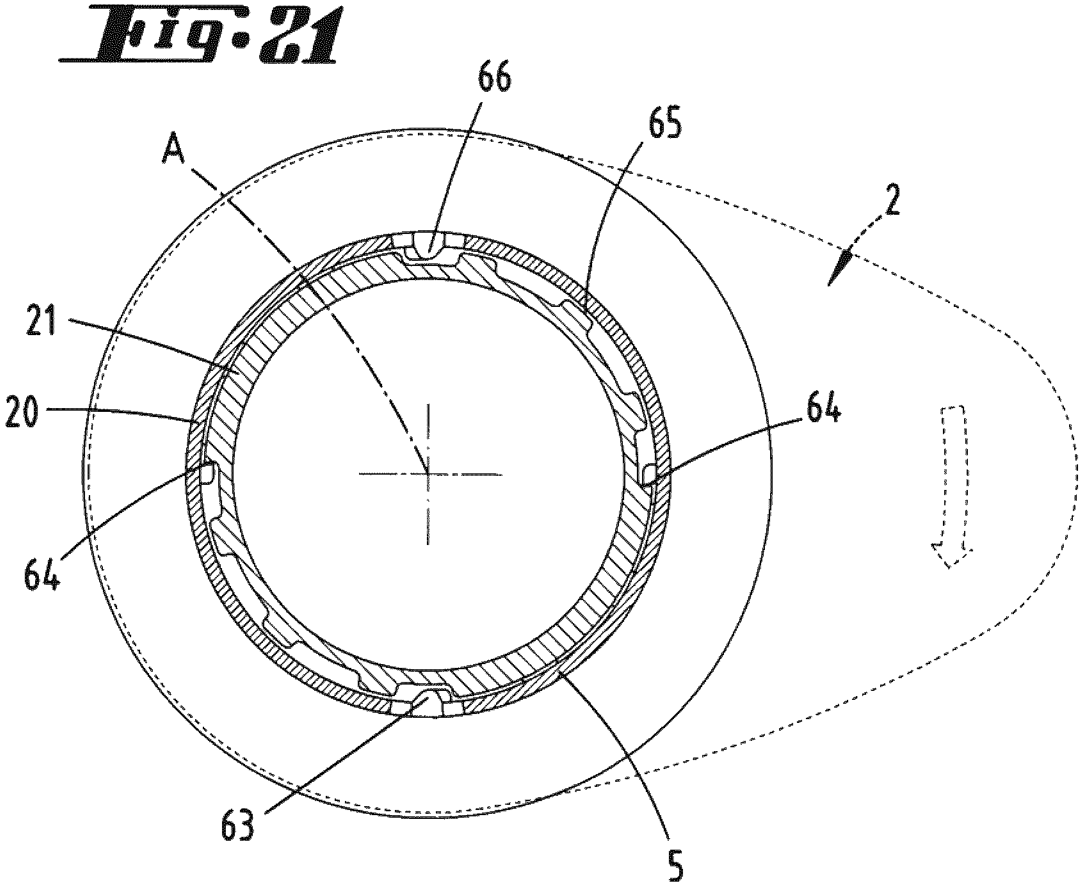
FIG. 21 a partial cross section of the pump head and a related pump part, preferably the pump chamber part, according to the lines indicated by XXI-XXI in FIG. 7, representing locked position of the pumping head.

Instead, as it is shown in FIG. 19 for the first embodiment, which is also applicable for this second embodiment of the locking action, it might be 10% or less up to 3, 4 or 5% of said height be given.

Figure 27:
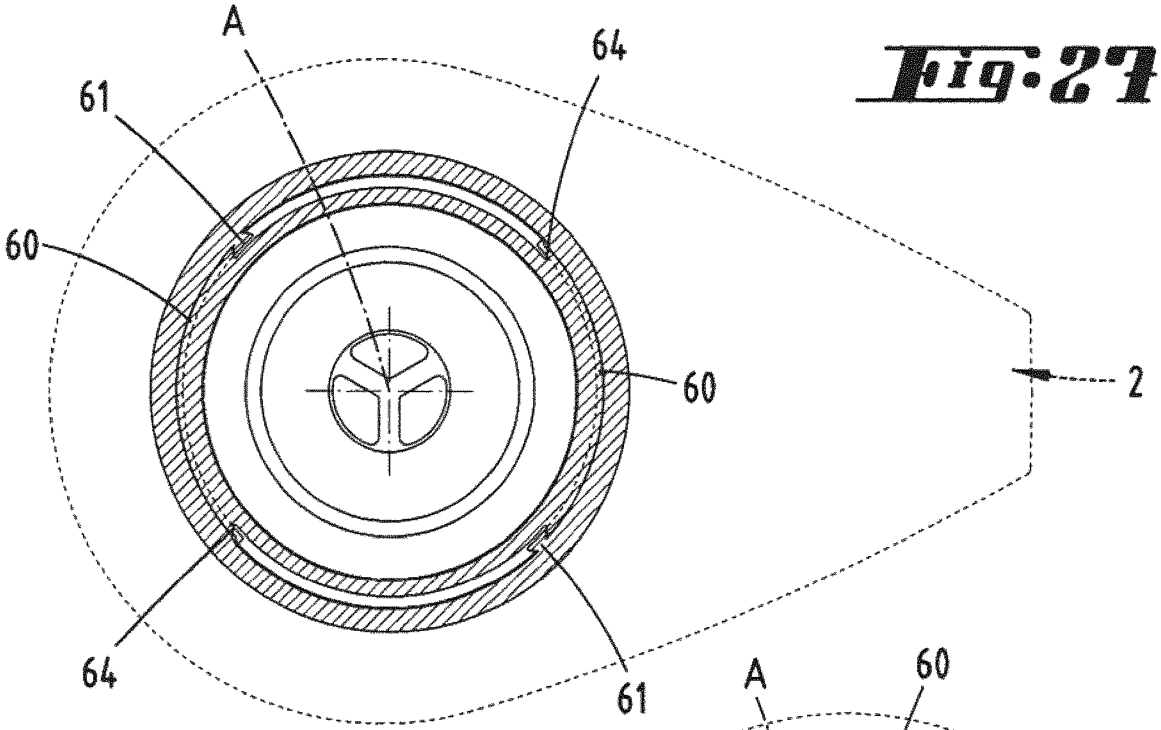
FIG. 27 a view according to FIG. 21, at a further embodiment concerning the locking provision.
Figure 28:
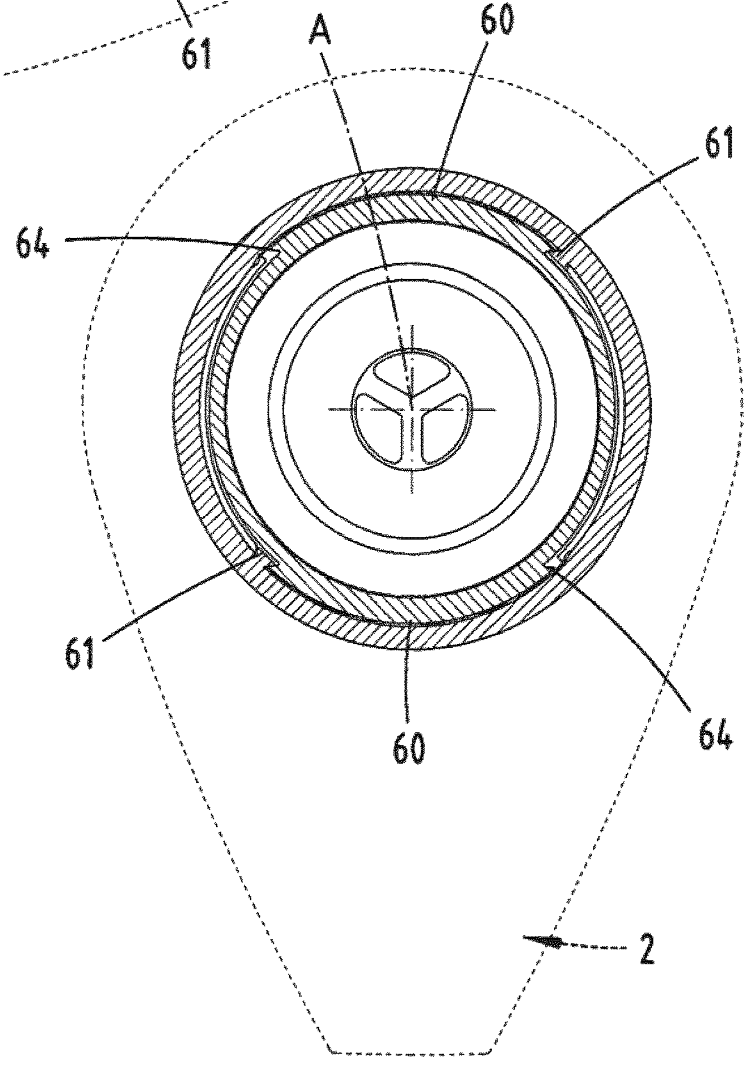
FIG. 28 a view according to FIG. 27, with the pump head turn for about 90° showing the unlocked position, similar to FIG. 22.

Preferably, as visible in FIG. 29 and FIGS. 27 and 28, two of such skirt rims 60 may be provided for mirror symmetrical to the length axis A. Preferably, this further embodiment does not provide any protrusions as described for the first embodiment. Rather in circumferential direction except for the possible one rim skirt 60 or between the two rim skirts 60 is a plain surface 74 which may provide for a good guidance in axial direction when moving the pump head at the occasion of a pump stroke. In this respect, either the rim of the pump head or the respective wall of the upper pump part may have protruding surfaces matching with the plain surface 74.

Further, at this embodiment are provided for a stop 61 being not overrunable and a further stop 66 being overrunable. Stop 66 is first reached by the skirt rim 60 when turning the pump head 2 into the locking position. Below to the stop 66 there might be a sloping, preferably small surface 75, which might be useful to guide the pump head by means of the lower edge of the skirt rim 60 into a somewhat raised position if this is not yet given when turning the pump head into the locking position.

The stop 61 is preferably not overrunable by the skirt rim 60. As it is to realize from FIGS. 27 and 28, in case of two skirt rims 60, there might be two such not overrunable stops 61 and two such overrunable stops 66.

The walls, at which the stops and the rim are provided for are the ones already described in view of the first embodiment in this respect, FIGS. 19 through 22. In this respect, therefore, reference is made to this further description.

REFERENCE NUMERALS

1 pump
2 pump head
3 pump housing part
4 suction tube
5 pump chamber part
6 receiving part
7 stabilization rib
8 outlet opening
9 receptacle
10 outlet channel
11 fluid
12 inlet valve
13 pump chamber
14 piston body
15 pump piston
16 outlet valve
17 stabilizing ring
18 bellows
19 outermost wall
20 receiving wall
21 pump head wall
22 concentric wall
23 concentric wall
24 second inner wall
25 inner space
26 disc-like valve part
27 rim part
28 stem part
29 abutment shoulder
30 sealing rim
31 opening
32 edge
33 pillar part
34 free space
35 free space
36 upper rim
37 flexible lip
38 third inner wall part
39 spring
40 abutment
41 circumferential surface
42 abutment part
43 corner
44 abutment rim
45 sealing lip
46 pot-like sealing part
47 attachment part
48 flexible arm
49 rib
50 rising wall part
51 attachment part
52 circumferential space
53 lower sealing lip
54 upper sealing lip
55 middle part
56 opening
57 neck
58 sealing ring
59 notch
60 skirt rim 61 stop
62 shoulder
63 stop
64 end surface
65 rip
66 stop
67 wall
68 valve part
69 sealing edge
70 sealing edge
71 inner sealing part
72 connecting food part
73 connecting ceiling part
74 surface
75 surface

The invention claimed is:

1. A pump (1) for dispensing a fluid (11), comprising;
- a pump head (2),
- a piston (15) with a piston body (14),
- a pump chamber (13) provided by a pump chamber part (5),
- an inlet valve (12) and an outlet valve (16),
- wherein the piston body (14) is moveable relative to the pump chamber (13),
- wherein the piston body (14) is tube-like, providing a channel for delivering the fluid (11) from the pump chamber (13) via the outlet valve (16) to an outlet opening (8) in the pump head (2),
- wherein the outlet valve (16) is provided by a valve body cooperating with a sealing rim,
- wherein the sealing rim is given by an opening in an outlet channel (10) of the pump head (2), leading to the outlet opening (8),
- wherein the piston body (14) is combined with the valve body for movement of the piston body (14) with the valve body,
- wherein the piston body (14) has a sealing lip for a sealing engagement with an inner surface of the pump chamber body,
- wherein the pump head (2) is moveable relatively to the piston body (14) providing an opening stroke for the outlet valve (16),
- wherein at once the valve body moves axially in the opposite direction into a part of the outlet channel being above the valve body,
- wherein the outlet valve consists of a disc-like valve part (26) with an outer upward protruding circumferential rim part (27), the outlet valve cooperating with the sealing rim (30) provided for in the pump head (2) given by an opening (31) in an outlet channel (10), extending within, and at least in an opening position, through a short tube-like portion,
- wherein the disc-like valve part (26) lies on the sealing rim (30) by means of an edge (32) designed at an outer surface of the disc-like valve part (26), and
- wherein the outer surface is designed convex in a cross section, providing the edge (32), or due to compression of the disc-like valve part (26), being in this case elastic, a comparatively broad sealing contact is obtained by surfaces lying on each other on a rather cylindrical area.

2. The pump according to claim 1, wherein the piston body (14) has two concentric walls (22, 23) comprising an outer wall (22) and an inner wall (23).

3. The pump according to claim 1, wherein the pump is further comprises restoring means configured for moving the pump head (2) back from the end position into the starting position.

4. The pump according to claim 3, wherein the restoring means is positioned outside the outer wall (22).

5. The pump according to claim 3, wherein the restoring means are provided for as a bellows (18).

6. The pump according to claim 1, wherein the pump head (2) has two circumferential pump head walls (19, 24), an inner head wall (24) and an outer pump head wall (19), the walls being combined at a common ceiling part (73) and being distant to each other over the whole circumference and up to a lower end of both the walls, seen in a dispensing direction of the fluid.

7. The pump according to claim 6, wherein the inner pump head wall (24) cooperates with the outer piston body wall (22) and the outer pump head wall (19) cooperates with the pump chamber body.

8. The pump according to claim 7, wherein cooperation of the inner pump head wall with the outer piston body wall (22) and the outer pump head wall (19) with the pump chamber body is a sliding engagement.

9. The pump according to claim 1, wherein the inlet valve (12) is formed in an extension of a bottom of the pump chamber (13) and is situated above the sealing lip of the piston engaging the pump chamber, in the starting position as well as in an actuated position of the pump.

10. The pump according to claim 1, wherein the pump head (2) has an outlet channel (10) and wherein the piston (15) has a fluid channel.

11. The pump according to claim 10, wherein the outlet channel (10) of the pump head extends essentially at a right angle to the fluid channel of the piston (15).

12. The pump according to claim 11, wherein the opening in the pump head (2) is in a bottom of the outlet channel (10).

13. The pump according to claim 11, wherein the fluid flowing through the open outlet valve (16) into the outlet channel (10) is at once diverted at about a right angle.

14. A pump (1) for dispending a fluid (11), comprising:
- a pump head (2),
- a piston (15) with a piston body (14),
- a pump chamber (13),
- an inlet valve (12) and an outlet valve (16),
- wherein the piston body (14) is moveable relative to the pump chamber (13) between an upper starting position and a lower end position, for performing a pumping stroke,
- wherein the piston body (14) provides a channel for delivering the fluid (11) from the pump chamber (13) via the outlet valve (16) to an outlet opening (8) in the pump head (2),
- wherein the piston body has two concentric walls (22, 23) comprising an outer wall (22) and an inner wall (23), wherein the outer wall and inner wall are combined at a common foot part (72) and are distant to each other over a whole circumference and up to an upper end of both walls, seen in a dispensing direction of the fluid, providing between the walls a receiving room for receiving a pump head wall (24) of the pump head (2), the inner wall (23) providing the channel,
- wherein the pump (1) has restoring means for moving the pump head (2) and the piston (15) from the lower end position back to the starting position,
- wherein the restoring means is positioned outside the channel for delivering the fluid, not coming into contact with the fluid (11), so that the restoring means do not come into contact with the fluid when dispensing the fluid (11), wherein the restoring means are positioned outside the outer wall of the piston body (14).

15. The pump according to claim 14, wherein the restoring means have a lower circumferential support body, being supported by a shoulder of a pump chamber body.

16. The pump according to claim 15, wherein in the starting position, the shoulder is in abutment with a sealing lip of the piston.

17. A pump (1) for dispensing a fluid (11), comprising:

a pump head (2), a piston (15) with a piston body (14), a pump chamber (13) provided by a pump chamber part (5), an inlet valve (12) and an outlet valve (16), wherein the piston body (14) is moveable relative to the pump chamber (13), wherein the piston body (14) is tube-like, providing a channel for delivering the fluid (11) from the pump chamber (13) via the outlet valve (16) to an outlet opening (8) in the pump head (2), the pump head (2) acting on the piston body (14) for performing a pumping stroke, moveable between an upper starting position and a lower end position, wherein the pump head (2) has a skirt providing a skirt rim (60) defining the starting position by an engagement with a first stop (61) provided for at a pump housing part (3), the pump head (2) being turnable about a vertical axis in the upper starting position, wherein an inner horizontal space is provided, defined by a space rim being a shoulder (62) disposed axially distant to the first stop (61), the horizontal space being configured for receiving the skirt rim (60) upon turning, locking the pump head (2) in the starting position, wherein a locked position of the pump head is limited by a second stop (63, 66), provided at the pump chamber part (5) or another respective pump part, and an end surface (64) of the skirt rim (60) rests against the second stop (63, 66) when the pump head (2) is fully turned in the locked position, wherein the second stop (63, 66) is overrunable by the skirt (60) and/or protruding ribs (65), which at once provide a user with an indication that the pump head is being turned ratchet like, the first stop (61) being not overrunable, wherein the second stop (63, 66) is first reached by the skirt rim (60) when turning the pump head (2) into the locked position, and wherein a sloping surface (75) is disposed below the second stop (63, 66) to guide the pump head by means of the lower edge of the skirt rim (60) into a raised position if the raised position is not yet achieved when turning the pump head into the locking position.

18. The pump according to claim 17, wherein the skirt rim (60) extends only over part of a circumference of the skirt.

19. The pump according to claim 17, wherein the horizontal space extends over a part of a circumference of the skirt.

20. A pump (1) for dispensing a fluid (11), comprising:

a pump head (2), a piston (15) with a piston body (14), a pump chamber (13) provided by a pump chamber part (5), an inlet valve (12) and an outlet valve (16), wherein the piston body (14) is moveable relative to the pump chamber (13), wherein the piston body (14) is tube-like, providing a channel for delivering the fluid (11) from the pump chamber (13) via the outlet valve (16) to an outlet opening (8) in the pump head (2), wherein the outlet valve (16) is provided by a valve body cooperating with a sealing rim, the sealing rim is given by an opening in an outlet channel (10) of the pump head (2), leading to the outlet opening (8), the piston body (14) is combined with the valve body for movement of the piston body (14) with the valve body, wherein the piston body (14) has a sealing lip configured for a sealing engagement with an inner surface of the pump chamber body, wherein the pump head (2) is moveable relative to the piston body (14) providing an opening stroke for the outlet valve (16), wherein at once the valve body moves axially in the opposite direction into a part of the outlet channel being above the valve body, wherein the outlet valve consists of a disc-like valve part (26) with an outer upward protruding circumferential rim part (27), the outlet valve cooperating with the sealing rim (30) provided for in the pump head (2) given by an opening (31) in an outlet channel (10), extending within, and at least in the opening position, through a short tube-like portion, wherein the disc-like valve part (26) is lying on the rim (30) by means of an edge (32) designed at the outer surface of the disc-like valve part (26), wherein the outer surface is designed convex in a cross section, forming the edge (32), or due to compression of the disc-like valve part (26), being in this case elastic, a comparatively broad sealing contact is given by surfaces lying on each other on a rather cylindrical area, wherein the disc-like valve part (26) has one or more pillar parts (33) which combine the outlet valve (16) with the piston body (14), the one pillar part (33) being arranged so as to allow a flowing around of the fluid or so as to leave a free space (34) between multiple of the one or more pillar parts, and a free space (35) therearound for allowing the fluid to flow around the pillar parts (33) in the opening position of the outlet valve (16), further around the outer surface of the disc-like valve part (26) for finally going into the pump head fluid channel (10), the one or more pillar parts (33) extend from an area within an inner concentric wall (23) of the piston body (14) up to above an upper rim (36) of the piston body (14) of the inner concentric wall (23), the upper rim (36) forming a flexible lip part (37) providing further an upper end of the piston body (14).

* * * * *